United States Patent
Gaubicher et al.

(10) Patent No.: US 10,651,473 B2
(45) Date of Patent: May 12, 2020

(54) LITHIUM-DOPED PERNIGRANILINE-BASED MATERIALS

(71) Applicants: CENTRE NATIONAL DE LA RECHERCHE SCIENTIFIQUE, Paris (FR); UNIVERSITE DE NANTES, Nantes (FR); UNIVERSITE DE PICARDIE JULES VERNE, Amiens (FR)

(72) Inventors: Joël Gaubicher, Nantes (FR); Dominique Guyomard, Sautron (FR); Bernard Lestriez, Nantes (FR); Jean-Pierre Bonnet, Paris (FR); Pablo Jimenez Manero, Nantes (FR)

(73) Assignees: CENTRE NATIONAL DE LA RECHERCHE SCIENTIFIQUE (CNRS), Paris (FR); UNIVERSITE DE NANTES, Nantes (FR); UNIVERSITE DE PICARDIE JULES VERNE, Amiens (FR)

( * ) Notice: Subject to any disclaimer, the term of this patent is extended or adjusted under 35 U.S.C. 154(b) by 408 days.

(21) Appl. No.: 15/121,293

(22) PCT Filed: Feb. 23, 2015

(86) PCT No.: PCT/EP2015/053689
§ 371 (c)(1),
(2) Date: Aug. 24, 2016

(87) PCT Pub. No.: WO2015/124757
PCT Pub. Date: Aug. 27, 2015

(65) Prior Publication Data
US 2019/0036123 A1    Jan. 31, 2019

(30) Foreign Application Priority Data

Dec. 23, 2014 (FR) .................................. 14 63231

(51) Int. Cl.
*H01M 4/60* (2006.01)
*H01G 11/06* (2013.01)
(Continued)

(52) U.S. Cl.
CPC ............. *H01M 4/606* (2013.01); *C04B 7/153* (2013.01); *C04B 7/243* (2013.01); *C04B 22/16* (2013.01);
(Continued)

(58) Field of Classification Search
CPC .. H01M 10/0525; H01M 4/625; H01M 4/474; H01M 10/0568; H01M 4/623;
(Continued)

(56) References Cited

U.S. PATENT DOCUMENTS

| | | | | |
|---|---|---|---|---|
| 2001/0012867 A1* | 8/2001 | Angelopoulos | ...... | C08G 61/123 524/352 |
| 2002/0114128 A1* | 8/2002 | Ryu | ....................... | H01G 9/025 361/508 |

(Continued)

OTHER PUBLICATIONS

Highly Doped Conjugated Polymers for Electrochemical Energy Storage, May 14, 2014, Lutkenhaus, J et al., ECS The Electrochemical Society (Year: 2014).*

(Continued)

*Primary Examiner* — Miriam Stagg
*Assistant Examiner* — Rachel L Zhang
(74) *Attorney, Agent, or Firm* — W&C IP

(57) ABSTRACT

The present invention relates to a new lithium-doped Pernigraniline-based material, a method for the preparation thereof, its use in various applications, an electrode comprising said lithium-doped Pernigraniline-based material and its preparation method, a membrane comprising said (Continued)

lithium-doped Pernigraniline-based material and its preparation method, and an electrochemical storage system comprising said electrode.

16 Claims, 7 Drawing Sheets

(51) Int. Cl.
| | |
|---|---|
| H01G 11/50 | (2013.01) |
| H01G 11/86 | (2013.01) |
| H01G 11/52 | (2013.01) |
| H01G 11/60 | (2013.01) |
| H01G 11/62 | (2013.01) |
| H01M 10/0525 | (2010.01) |
| H01M 4/66 | (2006.01) |
| H01M 4/74 | (2006.01) |
| H01M 10/0568 | (2010.01) |
| H01M 4/62 | (2006.01) |
| C04B 28/02 | (2006.01) |
| C04B 28/08 | (2006.01) |
| C04B 7/153 | (2006.01) |
| C04B 7/24 | (2006.01) |
| C04B 22/16 | (2006.01) |
| C08G 73/02 | (2006.01) |
| C04B 103/12 | (2006.01) |
| H01M 4/02 | (2006.01) |

(52) U.S. Cl.
CPC ............ *C04B 28/021* (2013.01); *C04B 28/08* (2013.01); *C08G 73/0266* (2013.01); *H01G 11/06* (2013.01); *H01G 11/50* (2013.01); *H01G 11/52* (2013.01); *H01G 11/60* (2013.01); *H01G 11/62* (2013.01); *H01G 11/86* (2013.01); *H01M 4/623* (2013.01); *H01M 4/625* (2013.01); *H01M 4/669* (2013.01); *H01M 4/747* (2013.01); *H01M 10/0525* (2013.01); *H01M 10/0568* (2013.01); *C04B 2103/12* (2013.01); *H01M 2004/028* (2013.01); *Y02P 40/143* (2015.11); *Y02P 40/145* (2015.11)

(58) Field of Classification Search
CPC ....... H01M 4/669; H01G 11/06; H01G 11/86; H01G 11/50; H01G 11/52; H01G 11/60; H01G 11/62
See application file for complete search history.

(56) References Cited

U.S. PATENT DOCUMENTS

| | | | |
|---|---|---|---|
| 2005/0084660 | A1 | 4/2005 | Kojima et al. |
| 2007/0212604 | A1* | 9/2007 | Ovshinsky ............. H01M 4/02 429/210 |
| 2010/0089872 | A1* | 4/2010 | Ihara ................. H01L 21/32134 216/83 |
| 2011/0138938 | A1* | 6/2011 | Giszter ................. G01D 21/00 73/866.5 |

OTHER PUBLICATIONS

Electrosprayed polyaniline as cathode material for lithium secondary batteries. Manuel et al.
Polyaniline: Synthesis and Characterization of Pernigraniline Base. Sun et al.
Search Report dated Apr. 21, 2015.

* cited by examiner

LITHIUM-DOPED PERNIGRANILINE-BASED MATERIALS

RELATED APPLICATIONS

This application is a National Phase Application of PCT/EP2015/053689 filed on Feb. 23, 2015, which in turn claims the benefit of European Patent Application No. 14 305254.6, filed on Feb. 24, 2014 the entirety of which are incorporated herein by reference.

BACKGROUND

Field of the Invention

The present invention relates to a new lithium-doped Pernigraniline-based material, a method for the preparation thereof, its use in various applications, an electrode comprising said lithium-doped Pernigraniline-based material and its preparation method, a membrane comprising said lithium-doped Pernigraniline-based material and its preparation method, and an electrochemical storage system (such as a battery or a supercapacitor) comprising said electrode.

Description of Related Art

Batteries comprising a positive electrode and a negative electrode separated by an electrolyte comprising a lithium salt in solution in a solvent are widely known. The operation of these batteries is provided by the reversible circulation of lithium ions in the electrolyte between the electrodes. The positive electrode is generally composed of a composite material comprising an active material such as lithium cobaltate ($LiCoO_2$) or lithium manganate ($LiMn_2O_4$), a binder such as polyvinylidenedifluoride (PVdF), and a carbon additive such as carbon black. The binder is generally used to maintain mechanical strain and limit the volume expansion upon cycling, and the carbon material is a material conferring electronic conduction. The negative electrode is generally composed of lithium metal or of an intercalated lithium compound.

In the field of electrochemical storage systems, the properties of the electrodes comprised in said systems are an important element as regards their overall performance. In order for a material to be able to be used as an active material or as an additive in said electrodes, it is desirable for it to have a high electronic conductivity and good electrochemical stability.

In recent years, batteries having a high energy density have come to be required, and research has been conducted on conducting polymers such as polyaniline, polythiophene or polypyrrole as polymer positive electrode materials or as binders. Indeed, the theoretical capacity of these polymer positive electrode materials is from 100 to 150 Ah/kg, and they generally display high electronic conductivity.

More particularly, polyaniline (PANi) has been extensively studied for use as a battery material. This organic conductor has good redox reversibility and high environmental stability. The use of conducting polymers as electrodes in batteries relies on the electrochemical redox processes. A given conductive polymer can be repeatedly cycled between different oxidation states, thereby acting as a reversible electrode for a rechargeable battery.

Neutral PANi exists under the following different forms:
the fully reduced form also called Leucoemeraldine (LE) which comprises about 100 mole % of N—H bonds (i.e. amine groups);
the half-oxidized form also called Emeraldine (E) which comprises about 50 mole % of amine groups and about 50 mole % of C=N double bonds (i.e. imine groups); and
the fully oxidized form also called Pernigraniline (PN) which comprises about 100 mole % of imine groups.

The various forms of polyaniline are characterized by their total charge Q of the polymer chain and their protonation state, that-is-to-say their mean atomic ratio hydrogen/nitrogen (H/N) for each "benzene-nitrogen" repeating unit (i.e. aniline repeating unit).

It is noted that Emeraldine and Pernigraniline can be in a deprotonated form (i.e. base form) which respectively leads to the following Emeraldine base (EB) and Pernigraniline Base (PNB) chemical formulae:

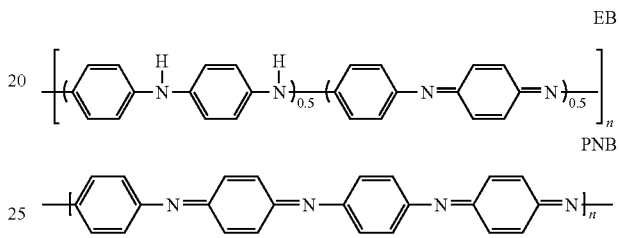

In EB, the mean atomic ratio hydrogen/nitrogen (H/N) for each aniline repeating unit is 4.5 and the total charge Q of the polymer chain is zero.

In PNB, the mean atomic ratio hydrogen/nitrogen (H/N) for each aniline repeating unit is 4 and the total charge Q of the polymer chain is zero.

Emeraldine and Pernigraniline can also be in a protonated form (i.e. salt form, A being the counter anion) which respectively leads to the following Emeraldine salt (ES) and Pernigraniline Salt (PNS) chemical formulae:

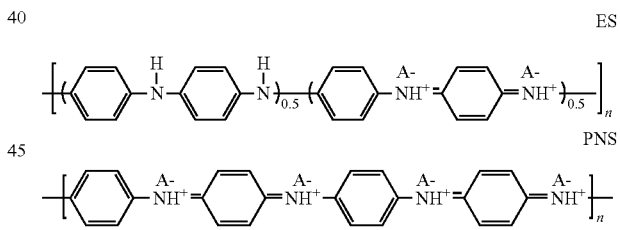

In both ES and PNS, the mean atomic ratio hydrogen/nitrogen (H/N) for each aniline repeating unit is 5 and the total charge Q of the polymer chain is zero.

Although the Leucoemeraldine and Emeraldine forms of polyaniline have been known and prepared for eighty years, the Pernigraniline form has only been successfully synthesized since the early nineties. As an example, Sun et al. [J. Chem. Soc., Chem. Comm., 1990, 529] described a method for the preparation of the Pernigraniline base form comprising a step of dissolving EB in N-methyl-pyrrolidinone (NMP) and glacial acetic acid, then a step of adding a solution comprising m-chloroperbenzoic acid and glacial acetic acid to the preceding reaction mixture, and then a step of adding triethylamine in the preceding reaction mixture to recover a precipitate. The precipitate is filtered and washed several times to obtain an analytically pure powder of PNB which displays 97 mole % of imine groups. However, this method has the drawback of leading to only tiny amounts of pure PNB. In addition, it has also been reported that this completely oxidized form of polyaniline (i.e. Pernigraniline) cannot be isolated and it decomposes while drying during its synthesis by oxidation of Emeraldine in aqueous acid media. The oxidation of Emeraldine base into Pernigraniline base is characterized by a decrease of the mean atomic ratio hydrogen/nitrogen (H/N) for each aniline repeating unit from 4.5 to 4, whereas the total charge Q of the polymer chain is not changed and remains equal to zero.

It is noted that Pernigraniline base cannot be obtained in situ by the implementation of a lithium battery comprising emeraldine as cathode, lithium metal as anode and a non-aqueous electrolyte since the transfer of protons is not probable to achieve electron neutrality during the redox process. Therefore, Pernigraniline base is unlikely to be formed in the non-aqueous electrolyte.

Recently, various dopants (e.g. polymeric counter-anions, metallic ionic salts, sulfonic acids, etc . . . ) have been used to improve physical and chemical properties of the stable Emeraldine (ES or EB) form of PANi. Among them, lithium ionic salts such as $LiClO_4$, $LiBF_4$, $LiPF_6$ and zinc ionic salts such as $Zn(ClO_4)_2$ were received much more attention and their application in rechargeable lithium ion batteries has been studied. As an example, Manuel et al. [Material Research Bulletin, 2010, 45, 265] studied the electrochemical properties of a lithium-doped EB film as a positive electrode in a Li/polyaniline cell. The lithium-doped EB film comprises approximately an equal amount of amine groups and imine groups.

The following scheme (1) shows the doping reaction of EB, with (x+y) being equal to about 0.5. Thus, the hydrogen (H)/nitrogen (N) mean atomic ratio for each aniline repeating unit in EB or EB-Li is about 4.5. In addition, the total charge Q of the polymer chain in EB or EB-Li is zero.

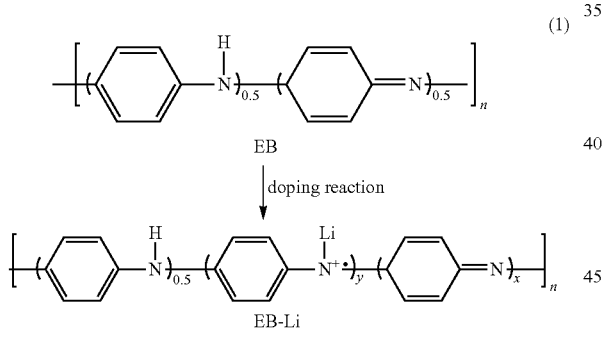

(1)

The method described to prepare the lithium-doped EB material comprises a first step of immersing an EB powder in 1M lithium salt ($LiPF_6$) solution in an equivolume mixture of ethylene carbonate and dimethyl carbonate, then a second step of washing, and then a third step of drying to obtain the Li-doped EB material. The electrochemical cell consisted of a mixture of the Li-doped EB material, carbon black and PVdF in a 70:20:10 weight ratio as cathode, lithium metal as anode, and EC:DMC (1:1, v/v) in 1M $LiPF_6$ as electrolyte solution. It was found that the obtained cathode displayed a specific capacity value on discharge of 142.5 mAh/g related to the EB mass. However, it has a poor cyclability since a 39% decrease of the discharge capacity is observed after 50 cycles.

OBJECTS AND SUMMARY

Consequently, an alternative polymer material which displays high chemical and physical performances (e.g. electrochemical properties and chemical stability) and can be used either as a polymer positive electrode material, as a conducting agent or as a binder without the above disadvantages is highly desirable.

More particularly, a first aim of the present invention is to provide a polymer material which is able to deliver a specific energy density superior to any of the prior art polymer materials and which combines a good electronic conductivity, a good ionic conductivity and a high stability during cycling. In addition, a second aim of the present invention is to provide a simple and economic preparation method which leads to a versatile polymer material displaying high chemical and physical performances.

This objective is achieved by the new lithium-doped Pernigraniline-based material which is described below.

A first object of the present invention is a lithium-doped Pernigraniline-based material (PN-Li), comprising:
  at least one polymer chain formed by the succession of $C_6H_4$ rings and nitrogen atoms, each nitrogen atom being linked in para position relative to each $C_6H_4$ ring;
  n repeating units;
  a total amount X of lithium cations ($Li^+$);
  an average amount x of lithium cations ($Li^+$) per repeating unit, with x=X/n;
  a total amount Y of anions ($A^{m-}$);
  an average amount y of charge provided by anions ($A^{m-}$) per repeating unit, with y=mY/n;
  a charge q of each repeating unit;
  a total charge Q of the polymer chain, with $$Q = \sum_{i}^{n} q_i,$$

and Q=mY−X since Q is compensated by the charges of $Li^+$ and $A^{m-}$,
  Q/n represents the formal oxidation state and Q/n=y−x; and wherein said PN-Li responds to the following formula (I):

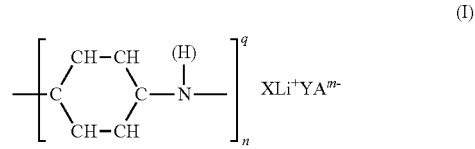

(I)

in which:
* 4≤n≤500,000, and preferably 100≤n≤10,000,
* q is equal to −1, 0 or +1,
* the atomic ratio hydrogen/nitrogen (H/N) (also called mean atomic ratio hydrogen/nitrogen (H/N) for each repeating unit) is such that 4≤H/N<4.5, and preferably such that 4≤H/N<4.4,
* −1≤Q/n<0,
* 0.5≤x≤1, and preferably 0.5≤x≤0.8,
* 0≤y<1, and preferably 0≤y≤0.5.

Astonishingly, the lithium-doped Pernigraniline-based material of the present invention denoted PN-Li is able to exchange reversibly up to 1 electron of charge for every —$C_6H_4N$— group (aniline repeating unit in the polymer chain) in a lithium electrolyte at a relatively high potential, which makes this material able to deliver an specific energy density superior to any other polymer materials. In addition, the highly electrical conducting nature of this material favors the kinetics of the charge and discharge processes, which makes this material useful as an additive to inorganic active materials, especially in the case of active materials with low conductivity. The most remarkable property of this material is its high stability during cycling at a broad potential window for a large number of cycles. Lastly, it shows unexpected and remarkable mechanical properties which make it a very versatile polymer material able to be prepared in many forms (membranes, coatings, thick films, etc . . . ).

In formula (I), the term "the atomic ratio hydrogen/nitrogen (H/N)" means the mean atomic ratio hydrogen/nitrogen (H/N) for each aniline repeating unit. Indeed, in the lithium-doped Pernigraniline-based material (PN-Li) of the present invention, some aniline repeating units may contain more than four hydrogen atoms provided that the mean atomic ratio hydrogen/nitrogen (H/N) for each aniline repeating unit is such that $4 \leq H/N < 4.5$, and preferably such that $4 \leq H/N < 4.4$.

In a preferred embodiment, lithium cations are coordinated to the nitrogen atoms in said polymer chain.

In a preferred embodiment, PN-Li does not comprise amine groups at all, which means that the H/N atomic ratio is equal to 4 (i.e. 4 H per N, said 4H corresponding to the four hydrogen atoms in each $C_6H_4$ ring).

It is noted that the possible presence of amine groups in the lithium-doped Pernigraniline-based material of the present invention is due to the possible presence of a small amount of Polyaniline (P) which is the starting reactant used to prepare the desired lithium-doped Pernigraniline-based material of the present invention.

The anion $A^-$ can be selected from $PF_6^-$, $ClO_4^-$, $BF_4^-$, $NO_3^-$, $N(SO_2CF_3)^-$, $AsF_6^-$, $CF_3SO_3^-$, $(CF_3SO_2)_3C^-$, $B(C_2O_4)_2^-$, $BF_2(C_2O_4)^-$, $N(C_4F_9SO_2)(CF_3SO_2)^-$, and mixtures thereof.

In the present invention, the structural formula (I) of PN-Li can also be written:
* either in the following manner:

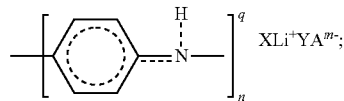

(I)

or
* according to the following chemical formula (I'):

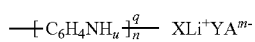

(I')

in which Q, q, n, X, x, Y, y, m have the same definitions as for formula (I), and u is such that $0 \leq u < 0.5$, and preferably such that $0 \leq u < 0.4$.

It is clear from the definition of "u" in the corresponding chemical formula (I') that the mean atomic ratio hydrogen/nitrogen (H/N) for each aniline repeating unit is such that $4 \leq H/N < 4.5$, and preferably such that $4 \leq H/N < 4.4$.

PN-Li can also be represented as a random copolymer by the general following formula (I"):

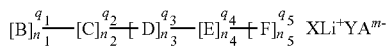

(I")

in which:
* $q_1 = -4$; $q_2 = -2$; $q_3 = 0$; $q_4 = -2$; $q_5 = 0$;
* n is the total number of repeating units as defined previously and is such that $n = 4$ $(n_1 + n_2 + n_3 + n_4 + n_5)$;
* X is the total amount of lithium cations ($Li^+$);
* x is the average amount of lithium cations ($Li^+$) per repeating unit, with $x = X/n$;
* Y is the total amount of anions ($A^{m-}$);
* y is the average amount of charge provided by anions ($A^{m-}$) per repeating unit, with $y = mY/n$;
* Q is the total charge of the polymer chain, with $Q = n_1 q_1 + n_2 q_2 + n_3 q_3 + n_4 q_4 + n_5 q_5$ and $Q = mY - X$ since Q is compensated by the charges of $Li^+$ and $A^{m-}$;
* Q/n represents the formal oxidation state and $Q/n = y - x$;
* the mean atomic ratio hydrogen/nitrogen (H/N) for each aniline repeating unit is such that $4 \leq H/N < 4.5$, and preferably such that $4 \leq H/N < 4.4$;
* $-1 \leq Q/n < 0$;
* $0.5 \leq x \leq 1$, and preferably $0.5 \leq x \leq 0.8$;
* $0 \leq y < 1$, and preferably $0 \leq y \leq 0.5$;
* $n_1 + n_2 > 0$, $n_3 \geq 0$, $n_4 \geq 0$ and $n_5 \geq 0$; and
* B, C, D, E and F have the respective following formulae:

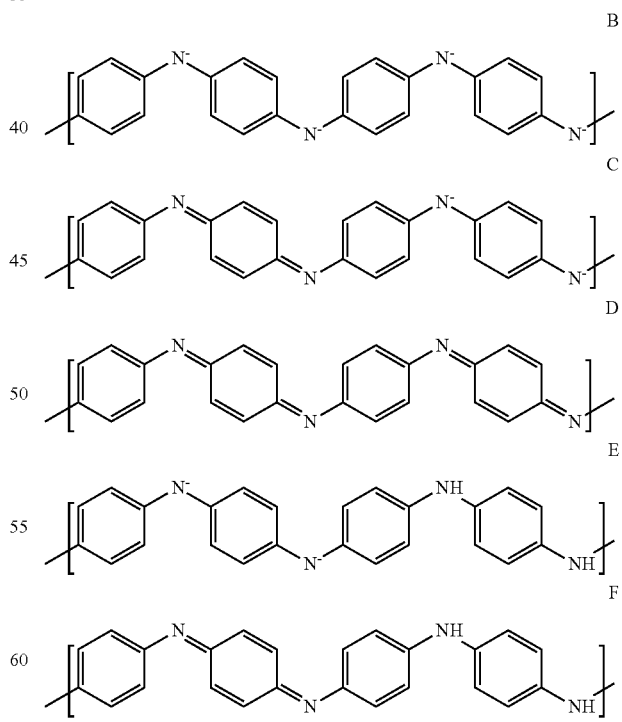

In one preferred embodiment:
* $n_2 = n_3 = n_4 = n_5 = 0$, $Q/n = -1$, $H/N = 4$ (with $X = 4n_1$ and $Y = 0$) and PN-Li has the following formula (I"-a):

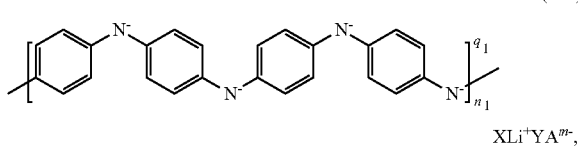

(I''-a)

XLi⁺YA^{m-}, or

* $n_1=n_3=n_4=n_5=0$, Q/n=−0.5, H/N=4 and PN-Li has the following formula (I''-b):

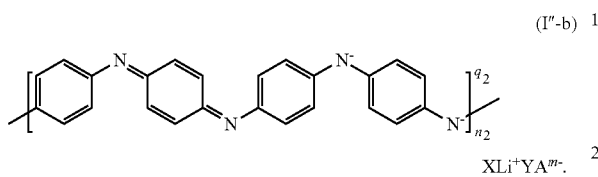

(I''-b)

XLi⁺YA^{m-}.

(I''-a) has the lowest possible formal oxidation state since Q/n=−1. (I''-b) can be obtained from (I''-a) by a two-electron oxidation.

Examples of PN-Li materials responding to formula (I'') may be any combinations of:

(a) some B with [some D and/or some E and/or some F], or (b) some C with [some D and/or some E and/or some F], or (c) some B with some C and optionally with [some D and/or some E and/or some F].

Specific examples of such combinations can be: BBCB-CBBCBC . . . (H/N=4), BBEBEBBEBE . . . (H/N=4.2), CFFCCFFC . . . (H/N=4.25), etc . . . .

Indeed, the compounds PN-Li responding to the formula (I'') as claimed in the present invention comprise:

i) compounds (I''-a) and (I''-b), but also ii) all the compounds having an intermediate oxidation state Q/n between the ones of compounds (I''-a) and (I''-b) and a H/N value of 4, iii) all the compounds having an intermediate oxidation state Q/n greater than the one of compound (I''-b) and a H/N value of 4, provided that Q/n<0, and iv) all the compounds mentioned in i), ii) and iii), in which some "N⁻" moieties have been replaced with some "N—H" moieties, provided that Q/n<0 and H/N<4.5.

The gradual substitution of some "N⁻" moieties by some "N—H" moieties raises the values of Q/n and H/N until reaching a Q/n value close to zero provided that Q/n<0, and a H/N value close to 4.5 provided that H/N<4.5.

A second object of the present invention is a method for the preparation of a lithium-doped Pernigraniline-based material (PN-Li) as defined in the first object of the present invention or of a composition (C') comprising said PN-Li, wherein it comprises at least the following steps:

1) putting into contact Polyaniline (P) or a composition (C) comprising at least Polyaniline (P), with a deprotonation solution to obtain a reaction mixture, said deprotonation solution comprising:

at least one aprotic solvent, at least one lithium salt which is soluble in said aprotic solvent, at least one lithiated organic compound (Li—OC$_1$) or precursors (PR$_1$, PR$_2$) of said lithiated organic compound Li—OC$_1$, said Li—OC$_1$ or one of the precursors (PR$_1$ or PR$_2$) being soluble in said aprotic solvent, and said Li—OC$_1$ being a strong Brönsted base able to deprotonate the amine groups present in Polyaniline (P), 2) leaving the reaction mixture with no mixing or with a moderate mixing, 3) recovering lithium-doped Pernigraniline-based material (PN-Li) or a composition (C') comprising at least one lithium-doped Pernigraniline-based material (PN-Li)

Thanks to this specific deprotonation solution, the complete or partial removal of the hydrogen atoms bonded to nitrogen atoms in Polyaniline as well as lithium doping are achieved. If the lithiated organic compound Li—OC$_1$ behaves as a redox active molecule, the reduction reaction of PN-Li is also achieved, leading to a Pernigraniline-based material (PN-Li) with the preferred composition of (I''a). The other PN-Li compounds claimed of the first object of the present invention can be produced either by using substoichiometric amounts of the lithiated organic compound (Li—OC$_1$) or the precursors (PR$_1$, PR$_2$) of said lithiated organic compound Li—OC$_1$ with respect to polyaniline (P), or by stopping the reaction before its completion.

Within the meaning of the present invention, the term "strong Brönsted base" is understood to mean "any chemical species able to accept one or more protons H⁺, preferably having a pKa value above 16".

Within the meaning of the present invention, the term "redox active molecule" is understood to mean any chemical species able to perform one or many reversible redox reactions, being reduced by accepting electrons from lithium metal and being oxidized by donation of electrons to polyaniline (P).

Polyaniline (P) can be in the emeraldine base state (EB), in the emeraldine salt state (ES), in the pernigraniline salt state (PNS) or in the leucoemeraldine state (LE); preferably in the emeraldine base state (EB), in the emeraldine salt state (ES) or in the leucoemeraldine state (LE); and more preferably in the emeraldine base state (EB).

All states of PN-Li material are directly achievable by the process of the present invention, depending on the starting Polyaniline (P) used in step 1). As an example, starting from EB will lead to compound of formula (I''-b).

Polyaniline (P) has an average molecular weight ranging from about 362 to 40,000,000 g/mol, and preferably from about 9000 to 900,000 g/mol.

Polyaniline (P) can comprise a catalytic amount of Polyaniline oligomers. These Polyaniline oligomers are soluble in the deprotonation solution and the presence of this catalytic amount of soluble Polyaniline oligomers helps deprotonating Polyaniline (P).

Within the meaning of the present invention, the term "catalytic amount" is understood to mean a proportion of Polyaniline oligomers less than 10% in weight related to the total amount of Polyaniline (P).

Within the meaning of the present invention, the term "Polyaniline oligomers" is understood to mean Polyaniline having an average molecular weight ranging from about 360 to 3600, and preferably from about 360 to 1800.

In a preferred embodiment, the aprotic solvent is a polar aprotic solvent so as to accelerate steps 2) and 3).

The aprotic solvent can be selected from cyclic and linear carbonates such as ethylene carbonate, propylene carbonate, butylene carbonate, dimethyl carbonate, diethyl carbonate, methyl propyl carbonate, dipropyl carbonate, ethyl methyl carbonate, vinylene carbonate, cyclic and linear ethers such as 1,3-dimethoxyethane, 1,3-diethoxyethane, 1,3-dioxolane, tetrahydrofuran, and mixtures thereof.

Propylene carbonate or a mixture of dimethyl carbonate and ethylene carbonate are preferred.

The lithium salt can be selected from $LiPF_6$, $LiClO_4$, $LiBF_4$, $LiNO_3$, $LiAsF_6$, $LiB(C_2O_4)_2$, $LiBF_2(C_2O_4)$, lithium salts having a perfluoroalkanesulphonate anion such as $LiN(SO_2CF_3)$, $LiCF_3SO_3$, $Li(CF_3SO_2)_3C$, $LiN(C_4F_9SO_2)(CF_3SO_2)$, and mixtures thereof.

$LiPF_6$ is preferred.

The deprotonation solution can further comprise an organic compound $OC_2$ which is soluble in said aprotic solvent and which comprises an alkene functional group, preferably a terminal vinyl group.

As an example of organic compound $OC_2$, vinylene carbonate, camphene, pinene, limonene, styrene, butadiene or isoprene can be mentioned.

As an example of organic compound $OC_2$ comprising a terminal vinyl group, styrene, butadiene or isoprene can be mentioned.

This organic compound $OC_2$ acts as a terminal acceptor (i.e. scavenger) of all the hydrogen atoms from Polyaniline and is consumed during the reaction since its alkene functional group is converted into an alkane functional group.

The lithiated organic compound Li—$OC_1$ is a Brönsted base in such a way that it does not act as a nucleophile reacting with Polyaniline.

The lithiated organic compound Li—$OC_1$ can be selected from lithium amides, lithium enolates, lithium ester enolates, lithium acetylides, organolithium compounds, and mixtures thereof.

The precursor $PR_1$ of the lithiated organic compound Li—$OC_1$ can be metallic lithium (Li) and the precursor $PR_2$ of the lithiated organic compound $OC_1$ can be any one of the following conjugated acids of $OC_1$: an amine, a ketone, an ester, an alkyne or an alkyl halide.

The amine can be selected from diisopropyl amine, diethylamine, pyrrole, indole, 2,2,6,6-Tetramethylpiperidine, Bis(trimethylsilyl)amine, dicyclohexyl amine, N,N'-Diphenyl-p-phenylenediamine, piperazine, diphenylamine, carbazole, morpholine, piperidine, pyrrolidine, imidazole and mixtures thereof.

The deprotonation solution must comprise a sufficient amount of lithiated organic compound Li—$OC_1$ or precursor $PR_1$ (Li) to deprotonate all the amine groups present in Polyaniline (P).

Step 1) can be carried out at a temperature ranging from about −20° C. to 180° C.

In step 1), the mass concentration of Polyaniline (P) in the deprotonation solution ranges from about 0.01 g/l to about 100 g/l, preferably from 0.1 g/l to 10 g/l.

The deprotonation solution can comprise from about 0.1 equivalent to about 50 equivalent of lithium salt with respect to Polyaniline (P).

The deprotonation solution can comprise from about 1 equivalent to about 5 equivalent of $OC_2$ with respect to Polyaniline (P).

The deprotonation solution can comprise from about 1 equivalent to about 5 equivalent of Li—$OC_1$ with respect to Polyaniline (P).

The deprotonation solution can comprise from about 1 equivalent to about 50 equivalent of the metallic lithium with respect to Polyaniline (P).

The deprotonation solution can comprise from about 0.01 equivalent to about 5 equivalent of the conjugated acid of $OC_1$ with respect to Polyaniline (P).

In the case precursors ($PR_1$, $PR_2$) of Li—$OC_1$ are used, $OC_1$ which is generated in situ is not consumed during step 2) and therefore, the conjugated acid of $OC_1$ does not need to be in stoichiometric amount with respect to P since a "proton shuttle" mediated by $OC_1$ occurs between P and Li.

The presence of water in said method has to be avoided so as to prevent from the reprotonation of PN-Li.

In step 1), Polyaniline (P) or the composition (C) comprising at least Polyaniline (P) can be in the form of a powder, a film, fibers, nanofibers, a monolith, a coating, etc. . . .

Thus, the obtained PN-Li (respectively the composition (C') comprising at least PN-Li) is produced in the same form as the form used for the starting material Polyaniline (respectively the composition C comprising Polyaniline).

Step 1) can be performed according to the following sub-steps:

1-1) preparing the deprotonation solution, preferably by dissolving the lithium salt in the aprotic solvent, and then adding the lithiated organic compound Li—$OC_1$ or the precursors ($PR_1$, $PR_2$) of said lithiated organic compound Li—$OC_1$, and the organic compound $OC_2$ if present, 1-2) introducing the Polyaniline (P) or the material comprising Polyaniline (P) in the deprotonation solution of step 1-1).

The duration of step 2) can vary from about 2 hours to about 48 hours.

In the case of using metallic lithium as $PR_1$ in step 2), the reaction mixture is preferably not stirred, so as to avoid the direct contact of the metallic lithium with Polyaniline (P). Indeed, metallic lithium may be floating freely and can cause the direct reduction of polyaniline (P) instead of its deprotonation, inducing a decrease of its deprotonation rate.

In the invention, "a moderate mixing or stirring" means a mixing or a stirring with a speed ranging from about 20 to about 120 revolutions per minute.

It is noted that the time required to complete the reaction depends on the morphology and the amount of the starting Polyaniline.

Step 2) can be carried out at a temperature ranging from about −20° C. to 120° C.

The recovering step 3) (i.e. purification and/or washing step) can be performed by filtration so as to separate the final product PN-Li as a solid from the solution.

The solid after filtration then can be washed several times with an aprotic solvent, preferably with the same aprotic solvent employed in step 1), and then can be dried to remove traces of solvent.

The process of the present invention allows at the same time the deprotonation and the doping with lithium of Polyaniline.

The final product PN-Li of the present invention is stable indefinitely towards hydrolysis in ambient conditions contrary to the other Pernigraniline-based materials described in the prior art.

A third object of the present invention is a positive electrode material comprising:

at least one polymeric binder, optionally a material conferring electronic conduction other than PN-Li, optionally an active material other than PN-Li, and wherein it further comprises a lithium-doped Pernigraniline material PN-Li as defined in the first object of the present invention or as prepared according to the method as defined in the second object of the present invention.

The polymeric binder can be selected from polytetrafluoroethylene (PTFE), polyvinylidenedifluoride (PVdF), polyethylene oxide (PEO), poly(hexafluoropropylene) (PHFP), polypropylene (PP), polyethylene (PE), poly(methyl acrylate) (PMMA) and copolymers and/or mixtures thereof. PTFE is preferred.

The positive electrode material can comprise from about 1 weight % to about 15 weight %, preferably from about 2 weight % to about 10 weight %, and more preferably from about 4 weight % to about 7 weight % of a polymeric binder with respect to the total weight of the positive electrode.

The positive electrode material of the present invention can have a loading of active material and/or PN-Li of about 1 to 50 $mg/cm^2$.

The material conferring electronic conduction can be a carbon-based material.

The material conferring electronic conduction is preferably selected from carbon blacks such as carbon superP®, acetylene blacks, natural or synthetic graphites, carbon aerogels and foams, carbon fibers such as vapor grown carbon fibers (VGCF®), carbon nanotubes, reduced graphite oxide, reduced graphene oxide and mixtures thereof. Vapor grown carbon fibers are preferred.

DETAILED DESCRIPTION

Figure 1:
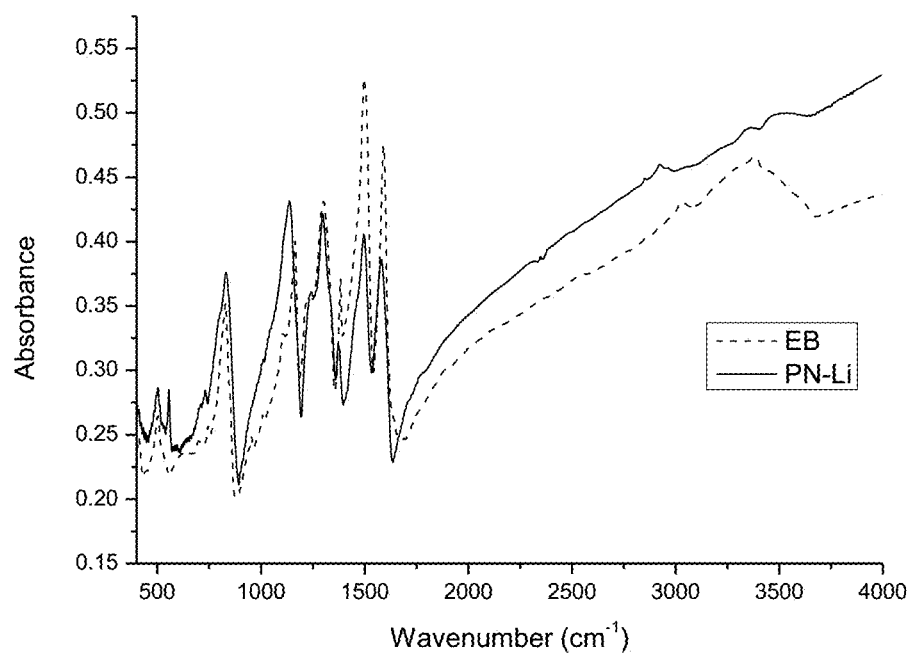
FIG. 1 represents a Fourier transform infrared spectroscopy graph from Example 1, in accordance with one embodiment.

The material conferring electronic conduction can have a specific surface area ranging from about 10 $m^2/g$ to about 3000 $m^2/g$, and preferably from about 400 $m^2/g$ to about 3000 $m^2/g$.

When the material conferring electronic conduction has a high specific surface area (i.e. ranging from about 400 $m^2/g$ to about 3000 $m^2/g$), it can be selected from activated carbon powders, activated carbon fabrics, carbon nanotubes, carbon nanofibers, reduced graphene oxides, pyrolized graphite oxides, carbon aerogels and mixtures thereof.

In a first embodiment, the positive electrode material does not comprise any other active material than PN-Li.

In this first embodiment, the positive electrode material can comprise at least about 35 weight %, at least about 60 weight %, and more preferably at least about 80 weight % of PN-Li with respect to the total weight of the positive electrode.

The positive electrode material can comprise at most about 98 weight % of PN-Li with respect to the total weight of the positive electrode.

Thus, in this first embodiment, the lithium-doped Pernigraniline-based material PN-Li of the present invention plays the role of an active material in the positive electrode material of the present invention.

Thanks to this positive electrode material containing PN-Li as an active material, it is possible to reach high values of specific capacity and energy density in lithium-ion batteries.

In a first variant of this first embodiment, the positive electrode material is a lithium battery-type positive electrode material comprising with respect to the total weight of the positive electrode material:

from about 60 weight % to about 98 weight %, and preferably from about 80 weight % to about 98 weight % of PN-Li, from about 1 weight % to about 15 weight %, and preferably from about 2 weight % to about 10 weight % of a material conferring electronic conduction other than PN-Li, and from about 1 weight % to about 15 weight %, and preferably from about 2 weight % to about 10 weight % of a polymeric binder.

This battery-type positive electrode material is specifically suitable for use in a battery.

In a second variant of this first embodiment, the positive electrode material is a supercapacitor-type positive electrode material comprising with respect to the total weight of the positive electrode material:

from about 35 weight % to about 60 weight %, and preferably from about 40 weight % to about 50 weight % of PN-Li, from about 15 weight % to about 60 weight %, and preferably from about 40 weight % to about 50 weight % of a material conferring electronic conduction other than PN-Li having a high specific surface area ranging from about 400 $m^2/g$ to about 3000 $m^2/g$.

from about 1 weight % to about 15 weight %, and preferably from about 2 weight % to about 10 weight % of a polymeric binder.

The supercapacitor-type positive electrode material can further comprise from about 1 weight % to about 15 weight %, and preferably from about 2 weight % to about 10 weight % of a material conferring electronic conduction other than PN-Li different from a material conferring electronic conduction having a high specific surface area ranging from about 400 m$^2$/g to about 3000 m$^2$/g.

This supercapacitor-type positive electrode material is specifically suitable for use in a supercapacitor.

This supercapacitor-type positive electrode material can be used as an electrode material for the positive electrode or for the negative electrode of a supercapacitor.

In a second embodiment, the positive electrode material is a lithium battery-type composite positive electrode material comprising from about 60 weight % to 96 weight % of an active material other than PN-Li with respect to the total weight of the positive electrode material.

Thus, in this second embodiment, the lithium-doped Pernigraniline-based material PN-Li of the present invention plays the role of an additive (e.g. conducting agent) in the positive electrode material of the present invention.

The active material is preferably selected from lithium iron phosphate (LFP), lithium manganese oxide (LMO), lithium nickel-manganese-cobalt oxides (NMC), lithium cobalt oxide (LCO), lithium nickel-cobalt-aluminum oxides (NCA), and mixtures thereof.

The composite positive electrode material can comprise at most 35 weight % of PN-Li with respect to the total weight of the positive electrode with respect to the total weight of the composite positive electrode material.

In this second embodiment, the composite positive electrode material can comprise at least about 1 weight %, and preferably at least about 1.5 weight % of PN-Li with respect to the total weight of the composite positive electrode material.

The composite positive electrode material can comprise from about 1 weight % to about 15 weight %, and preferably from about 2 weight % to about 10 weight % of a material conferring electronic conduction other than PN-Li with respect to the total weight of the composite positive electrode material.

At least one part of PN-Li can be in the form of PN-Li nanofibers, and preferably at least 5 weight % of PN-Li is in the form of PN-Li nanofibers.

When at least one part of PN-Li is in the form of PN-Li nanofibers, the composite positive electrode material preferably does not comprise any other material conferring electronic conduction than PN-Li (i.e. does not comprise carbon-based material such as carbon blacks, acetylene blacks, natural or synthetic graphites, carbon fibers, carbon nanotubes, and mixtures thereof). Thus, PN-Li nanofibers can be a substitute to materials conferring electronic conduction such as carbon-based materials.

Indeed, PN-Li combines electronic conductivity with a good ionic conductivity in the electrolytes usually employed in lithium batteries. This represents an advantage with respect to conducting carbon materials whose ionic permeability is low, especially in the case where the carbon is placed at the interface between the active material and the electrolyte. The use of the material of our invention as a substitute of the carbon coating of active material particles results in an improvement of the performance at high charge and discharge rates. This translates into an enhancement of the energy when the electrode is included in a battery operating at high power.

Thus, the material of the present invention PN-Li serves as a multi-purpose additive for electrodes with special utility in the production of thick electrodes, preferably electrodes having a thickness greater than 100 μm, or electrodes with a high surface energy density, preferably electrode having a surface energy density greater than 12 mWh/cm$^2$.

Indeed, increasing the thickness of an electrode translates into an increase of the average distance from the active material to the current collector (path covered by the electrons) and to the bulk electrolyte (path covered by ions). Hence, the limitations to both electrical and ionic transport become a critical issue. An effective electronic transport in the electrode relies in the presence of a good conducting network that can reach all the particles of the active material. PN-Li is such a good conducting network and can thus replace particles of carbonaceous additives which are usually used in the prior art electrodes.

Moreover, the ionic transport is ensured by the porosity in the electrode which once filled with the electrolyte has to form a low tortuosity path for the ions to reach the active material. To avoid limitations in the ionic transport, the porosity in the electrode also has to be large (>30% in volume with respect to the total volume of the electrode material) to facilitate ionic transport. In these conditions however, electronic contacts between the active material and the carbon additives become loose which alters the electronic transport. A conducting polymer such as PN-Li as defined in the present invention is a material whose morphology can be tailored at all the size scales, using a variety of synthesis and processing techniques of such as soft and hard templating, in situ polymerization, nanoscale patterning, self-assembly, etc, and therefore which can have the required properties to improve ionic transport.

A fourth object of the present invention is a method for the preparation of a positive electrode material as defined in the third object of the present invention, wherein said method comprises at least the following steps:

A) preparing a composition comprising Polyaniline (P), at least one polymeric binder, optionally a material conferring electronic conduction other PN-Li, and optionally an active material other than PN-Li, and B) preparing a composition comprising at least one lithium-doped Pernigraniline-based material (PN-Li) from the composition of step A), according to the preparation method as defined in the second object of the present invention.

Thus, the positive electrode material is constituted of the composition prepared in step B).

Polyaniline (P) is as defined in the second object of the present invention.

The polymeric binder, the material conferring electronic conduction other PN-Li, and the active material other than PN-Li are as defined in the third object of the present invention.

When the composition of step A) does not comprise any other active material than PN-Li, step A) can be simply achieved by mixing Polyaniline (P) with at least one polymeric binder and optionally a material conferring electronic conduction other PN-Li.

When the composition of step A) comprises an active material other than PN-Li, step A) can comprise the following sub-steps:

$A_1$) dispersing Polyaniline (P) in a solvent such as NMP, dimethylsulfoxide (DMSO), dimethylformamide (DMF), m-cresol, dimethylacetamide (DMAc), THF or isopropanol.

$A_2$) adding an active material other than PN-Li to the dispersion of step $A_1$), $A_3$) stirring the preceding mixture of step $A_2$), A$_4$) adding, preferably dropwise, a solvent such as ethanol (EtOH), methanol (MeOH), water in the preceding mixture of step A$_3$) while stirring, A$_5$) recovering the active material other than PN-Li coated with Polyaniline (P), and A$_6$) mixing the active material other than PN-Li coated with Polyaniline (P) obtained in step A$_5$) with at least one polymeric binder and optionally a material conferring electronic conduction.

The recovering step A$_5$) (i.e. purification and/or washing step) can be performed by filtration so as to separate the active material other than PN-Li coated with Polyaniline (P) as a solid from the solution.

The solid after filtration can then be washed several times with a solvent such as EtOH and dried.

A fifth object of the present invention is a lithium battery comprising:

a positive electrode material, a negative electrode material, preferably selected from lithium metal, a lithium alloy, an intercalated lithium compound, carbon graphite, silicon, silicon carbide, and lithium titanate.

a separator which acts as electrical insulator and allows the transport of ions, and a non-aqueous electrolyte comprising at least one lithium salt and an aprotic solvent, and wherein the positive electrode material is a battery-type positive electrode material or a battery-type composite positive electrode material as defined in the third object of the present invention or prepared according to the preparation method as defined in the fourth object of the present invention.

The lithium salt can be selected from LiPF$_6$, LiClO$_4$, LiBF$_4$, LiNO$_3$, LiN(SO$_2$CF$_3$), LiAsF$_6$, LiCF$_3$SO$_3$, u(CF$_3$SO$_2$)$_3$C, LiB(C$_2$O$_4$)$_2$, LiBF$_2$(C$_2$O$_4$), LiN(C$_4$F$_9$SO$_2$)(CF$_3$SO$_2$), and mixtures thereof.

The aprotic solvent can be selected from ethylene carbonate, propylene carbonate, butylene carbonate, dimethyl carbonate, diethyl carbonate, methyl propyl carbonate, dipropyl carbonate, ethyl methyl carbonate, vinylene carbonate, 1,3-dimethoxyethane, 1,3-diethoxyethane, 1,3-dioxolane, tetrahydrofurane, and mixtures thereof.

The non-aqueous electrolyte is preferably a 1M LiPF$_6$ in a mixture of EC and DMC in a 1:1 volume proportion.

The present invention allows the repeated cycling of PN-Li without any degradation of the material, with excellent capacity retention improving the stability of the material with respect to other previously reported "lithium doped" Polyaniline materials.

A sixth object of the present invention is a supercapacitor comprising:

a positive electrode material, a negative electrode material having a high specific surface area (i.e. ranging from about 400 m$^2$/g to about 3000 m$^2$/g), preferably selected from activated carbon powders, activated carbon fabrics, carbon nanotubes, carbon nanofibers, reduced graphene oxides, pyrolized graphite oxides, carbon aerogels and mixtures thereof, a separator which acts as electrical insulator and allows the transport of ions, and a non-aqueous electrolyte comprising at least one lithium salt and an aprotic solvent, and wherein the positive electrode material is a supercapacitor-type positive electrode material as defined in the third object of the present invention or prepared according to the preparation method as defined in the fourth object of the present invention.

It is noted that the materials (positive electrode material and negative electrode material) used respectively for the positive electrode and the negative electrode of said supercapacitor can be inverted.

The lithium salt can be selected from LiPF$_6$, LiClO$_4$, LiBF$_4$, LiNO$_3$, LiN(SO$_2$CF$_3$), LiAsF$_6$, LiCF$_3$SO$_3$, u(CF$_3$SO$_2$)$_3$C, LiB(C$_2$O$_4$)$_2$, LiBF$_2$(C$_2$O$_4$), LiN(C$_4$F$_9$SO$_2$)(CF$_3$SO$_2$), and mixtures thereof.

The aprotic solvent can be selected from ethylene carbonate, propylene carbonate, butylene carbonate, dimethyl carbonate, diethyl carbonate, methyl propyl carbonate, dipropyl carbonate, ethyl methyl carbonate, vinylene carbonate, 1,3-dimethoxyethane, 1,3-diethoxyethane, 1,3-dioxolane, tetrahydrofuran, gamma-butyrolactone, acetonitrile, dimethyl formaldehyde and mixtures thereof.

The non-aqueous electrolyte is preferably a 1M LiPF$_6$ in a mixture of EC and DMC in a 1:1 volume proportion.

A seventh object of the present invention is a free-standing membrane comprising with respect to the total weight of the membrane:

from about 2% to 15 weight % of a polymeric binder, and wherein it further comprises from about 85 weight % to 98 weight % of PN-Li as defined in the first object of the present invention or as prepared according to the method as defined in the second object of the present invention.

The membrane is preferably in the form of a film.

In a preferred embodiment, the membrane has a thickness ranging from about 0.1 to 10 μm.

The polymeric binder can be selected from poly(vinylidenedifluoride) (PVdF), polyethylene oxide (PEO), poly(vinyl alcohol) (PVA), polycarbonates, polyesters, polyamides, polyimides, polyurethanes, and copolymers or mixtures thereof. PVdF is preferred.

An eighth object of the present invention is a method for the preparation of a membrane as defined in the seventh object of the present invention, wherein said method comprises at least the following steps:

i) preparing a composition comprising Polyaniline (P) and at least one polymeric binder in the form of a film, ii) preparing a composition comprising at least one lithium-doped Pernigraniline-based material (PN-Li) from the composition of step i), according to the preparation method as defined in the second object of the present invention.

Polyaniline (P) is as defined in the second object of the present invention.

Step i) can comprise the following sub-steps:

i$_0$) mixing Polyaniline (P) and at least one polymeric binder in a solvent such as N-methylpyrrolidinone (NMP), dimethylsulfoxide (DMSO), dimethylacetamide (DMAc), dimethylformamide (DMF), or m-cresol.

i$_1$) depositing the mixture of step i$_0$) on a support, i$_2$) drying to obtain a composition comprising at least Polyaniline (P) in the form of a film on the support, i$_3$) peeling off the film from the support.

The support can be selected from flat glass surfaces, flat metallic surfaces, flat ceramic surfaces or flat plastic surfaces.

The support can have a surface area of between about 4 and 200 cm$^2$.

The drying step can be performed at a temperature ranging from about 30° C. to 80° C.

By this method, a flexible resistant electrically conducting thin free-standing membrane is obtained.

A ninth object of the present invention is a method for the preparation or the modification of a lithium-doped Pernigraniline-based material (PN-Li) as defined in the first object of the present invention or as prepared according to the method defined in the second object of the present invention, wherein it comprises at least one step of submitting to a charge or discharge (i.e. an electrochemical charge or discharge), a battery or a supercapacitor as defined in the fifth or the sixth object of the present invention.

During this method, a specific PN-Li material, which is the starting material, can be oxidized or reduced in the presence of the non-aqueous electrolyte of the battery or the supercapacitor when submitted to a charge so as to lead to another specific PN-Li material. Thus, the formal oxidation state Q/n as well as the proportions of lithium cations and anions change, whereas the atomic ratio H/N remains constant.

The method according to the ninth object of the present invention is indeed a method for modifying the formal oxidation state Q/n as well as the proportions of lithium cations and A anions of a PN-Li material as defined in the first object of the present invention, while not changing its mean atomic ratio H/N for each aniline repeating unit.

The following scheme (2) can represent the reversible exchange, at potentials greater than 3.0V vs. Li, between two different formal oxidation states with values of Q/n of −1 and −0.5 respectively. The redox transition between the two mentioned oxidation states permits the exchange of 1 electron per aniline repeating unit in the polymer chain. PN-Li material (I″-a) displays a formal oxidation state Q/n of −1 and PN-Li material (I″-b) displays a formal oxidation state Q/n of −0.5.

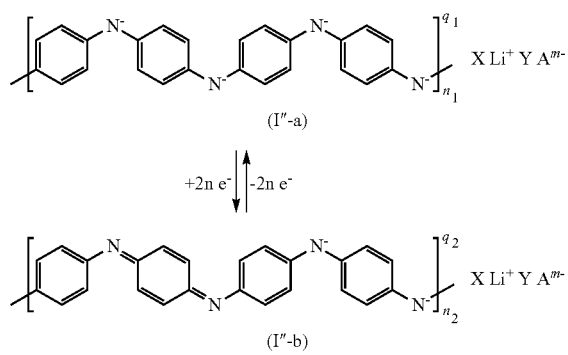

An eleventh object of the present invention is the use of the lithium-doped Pernigraniline-based material PN-Li as defined in the first object of the invention or prepared according to the method as defined in the second object of the invention, as an active material in electrodes, as a binder, or as a conducting agent, in batteries, supercapacitors, electronic/optoelectronic devices like solar cells, photoconductors, light-emitting or electrochromic devices, field effect transistors, electromagnetic radiation absorbers, gas sensors, separation membranes, antistatic coatings, conducting molecular wires and anticorrosion coatings.

The present invention is illustrated in more details in the examples below, but it is not limited to said examples.

EXAMPLES

The starting materials used in the examples which follow, are listed below:

Lithium hexafluorophosphate (LiPF$_6$): Purolyte®, Novolyte, ≥99.99% purity;

Dimethyl carbonate (DMC): Purolyte®, Novolyte, ≥99% purity;

Ethylene carbonate (EC): Purolyte®, Novolyte, ≥99% purity;

N,N'-diphenyl-p-phenylenediamine: Alfa Aesar, 97% purity;

Metallic lithium used for the synthesis: Aldrich, 99.9% purity;

Lithium metal used as a negative electrode: Aldrich, 99.9% purity;

Emeraldine base (EB): Aldrich, molecular weight (MW) ~50,000;

Polytetrafluoroethylene (PTFE): Aldrich;

Vapour grown carbon fibers (VGCF): Showa Denko;

N-methyl-2-pyrrolidinone (NMP): Aldrich, ≥99% purity;

LiFePO$_4$ (LFP): Umicore;

Carbon coated LiFePO$_4$ (LFP/C): Umicore, 2.5 wt % of carbon content;

Ethanol (EtOH): Carlo Erba, 96% EtOH in volume;

Reduced graphene oxide (rGO): xGnP®, xGsciences;

Conductive Carbon SuperP®: Timcal;

Poly(vinylenedifluoride) (PVdF): Aldrich;

These starting materials were used as received from the manufacturers, without additional purification.

EB nanofibers were synthetized according to the method reported in Jiménez et al. [Macromol. Rapid Comm., 2009, 30(6), 418-422].

The charge/discharge and cyclic voltammetry investigations were carried out using a VMP3 Scanning Probe Electrochemistry (SPE) platform commercialized by Bio-Logic Science Instruments, and an EC-Lab software commercialized by Bio-Logic Science Instruments.

Transmission electron microscopy (TEM) was performed by using a H9000NAR 300 kV microscope commercialized by Hitachi.

XPS analyses were performed by using a Kratos Axis Ultra spectrometer. The X-ray source is Al K working at 1486.6 eV.

Example 1

Preparation of a Lithium-Doped Pernigraniline Material PN-Li According to the Present Invention (i.e. First Object of the Invention) and Prepared According to the Process of the Present Invention (i.e. Second Object of the Invention)

Inside an argon-filled glove box, 2.1 g of LiPF$_6$ were dissolved in 10 ml of propylene carbonate. To the resulting solution, 160 mg of N,N'-diphenyl-p-phenylenediamine and 100 μl of styrene were added. Then, a piece of 0.5 g of metallic lithium was introduced in the preceding solution. Then, 250 mg of polyaniline powder in the emeraldine base state (EB) was introduced in the preceding solution. The reaction was left with no agitation for 16 hours. The lithium was then removed from the reaction mixture and said reaction mixture was filtrated. A solid was recovered and washed twice with 20 ml of dimethyl carbonate (DMC) to yield 239 mg of the desired material PN-Li (95% yield).

FIG. 1 represents a Fourier transform infrared spectroscopy (FTIR) of PN-Li (curve with a plain line), and to provide a comparison of Emeraldine base EB (curve with a dotted line). FIG. 1 shows the absorbance as a function of the wavenumber (in cm$^{-1}$). It can be concluded that the PN-Li material maintains the structure of a polyaniline, since the main vibration modes of EB are preserved with variations in frequency and relative intensity.

The FTIR analysis has been performed using the potassium bromide (KBr) Pellet Method with an apparatus Vertex 70 commercialized by Bruker).

Figure 2:
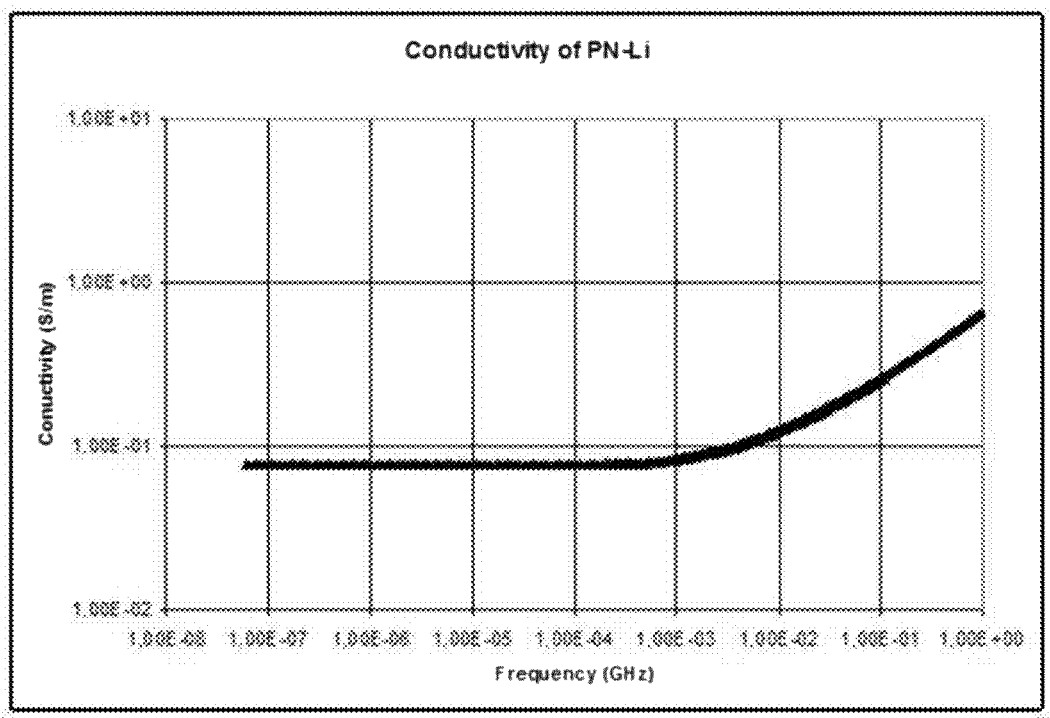
FIG. 2 is a graph of the conductivity of PN-Li (in S/m) as a function of the frequency (in GHz) from Example 1, in accordance with one embodiment.

FIG. 2 represents the conductivity of PN-Li (in S/m) as a function of the frequency (in GHz). The conductivity has been measured on 7 mm diameter pressed pellets of PN-Li material using simultaneously an impedance analyzer (Agilent 4294 from 40 to $1.1 \cdot 10^7$ Hz) and a network analyzer (HP 8510 from $4.5 \cdot 10^7$ to $10^9$ Hz).

Example 2

Preparation of a Lithium Battery (Fifth Object of the Invention) Comprising an Electrode Material E1-PN-Li According to the Present Invention (i.e. Third Object of the Invention) Prepared According to the Process of the Present Invention (i.e. Fourth Object of the Invention)

Inside an argon-filled glove box, 2.1 g of $LiPF_6$ were dissolved in 10 ml of a dimethyl carbonate and ethylene carbonate mixture in a 1:1 volume proportion. To the resulting solution, 160 mg of N,N'-diphenyl-p-phenylenediamine and 100 µl of styrene were added. Then, a piece of 0.5 g of metallic lithium was introduced in the preceding solution. Then, 250 mg of a mixture of EB, polytetrafluoroethylene (PTFE) and vapour grown carbon fibers (VGCF) in 90:5:5 weight proportions was embedded in a stainless steel wire mesh current collector and the resulting embedded stainless steel wire was introduced in the preceding solution. The reaction was left undisturbed for 16 hours. The lithium was then removed from the reaction mixture and said reaction mixture was filtrated. A solid was recovered and washed twice with 20 ml of DMC to yield the desired positive electrode material E1-PN-Li embedded in the stainless steel wire mesh current collector (E1-PN-Li/current collector). The positive electrode material E1-PN-Li produced had a loading of mg of PN-Li/cm² approximately and the thickness of the whole (E1-PN-Li/current collector) was about 280 µm.

A lithium battery (Swagelok® type cell) comprising:
the obtained positive electrode material E1-PN-Li embedded in the stainless steel wire mesh current collector (5 mg of E1-PN-Li material),
lithium metal as a negative electrode material deposited onto a copper current collector; the thickness of the lithium metal was about 400 µm,
a solution of 1M $LiPF_6$ in a mixture of EC and DMC in a 1:1 volume proportion as an electrolyte, and
a Whatman® glass fiber separator provided by GE Healthcare
was assembled inside a glove box commercialized by Jacomex.

Figure 3:
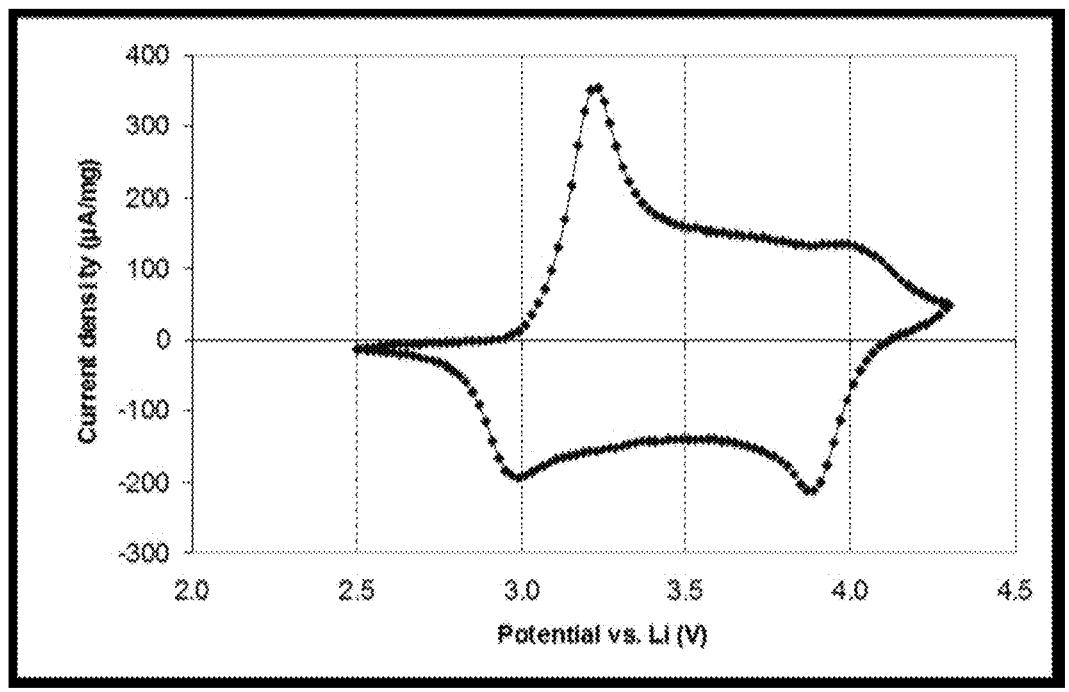
FIG. 3 is a plot of the electrochemical characterization of the E1-PN-Li electrode material by cyclic voltammetry from Example 3, in accordance with one embodiment.

FIG. 3 represents the electrochemical characterization of the E1-PN-Li electrode material by cyclic voltammetry. FIG. 3 shows the current density (in microAmpere per milligram, µA/mg) as a function of the potential (in Volts, V) versus the couple $Li^+/Li^0$ (i.e. vs $Li^+/Li^0$ potential). In FIG. 3, the lithium battery was subjected to a cyclic voltammetry test between 4.3 V and 2.5 V with negative electrode as reference potential, at a scan speed of 0.1 mV/s.

Figure 4:
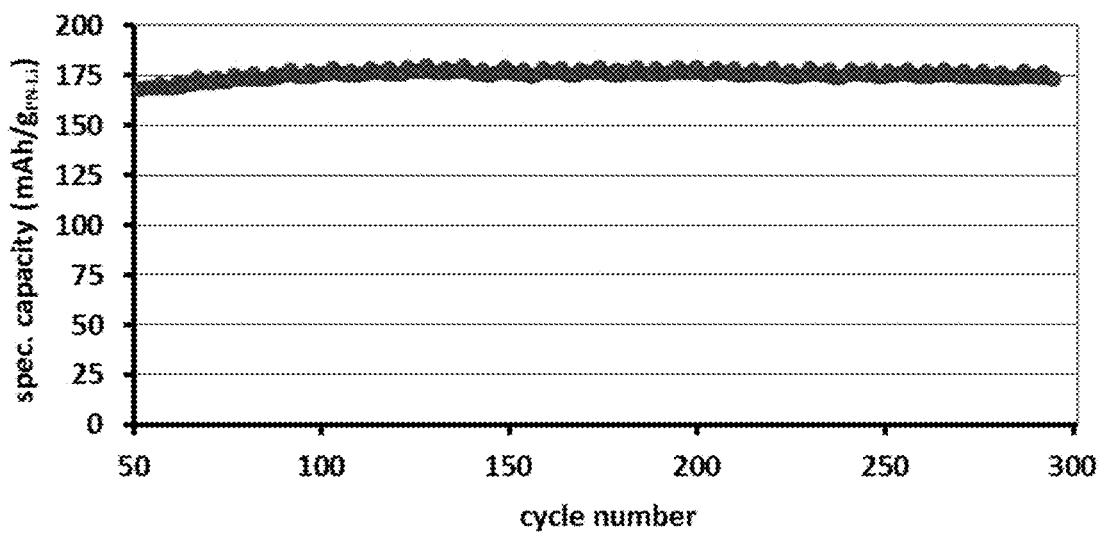
FIG. 4 is a graph of the specific capacity obtained during repeated cycling of the battery between 2.5 and 4.3 V at a 250 µA current for charge and discharge from Example 2, in accordance with one embodiment.

FIG. 4 represents the specific capacity obtained during repeated cycling of the battery between 2.5 and 4.3 V at a 250 µA current for charge and discharge. FIG. 4 shows the specific capacity (in $mAh/g_{pN-Li}$) as a function of the cycle number.

Figure 5:
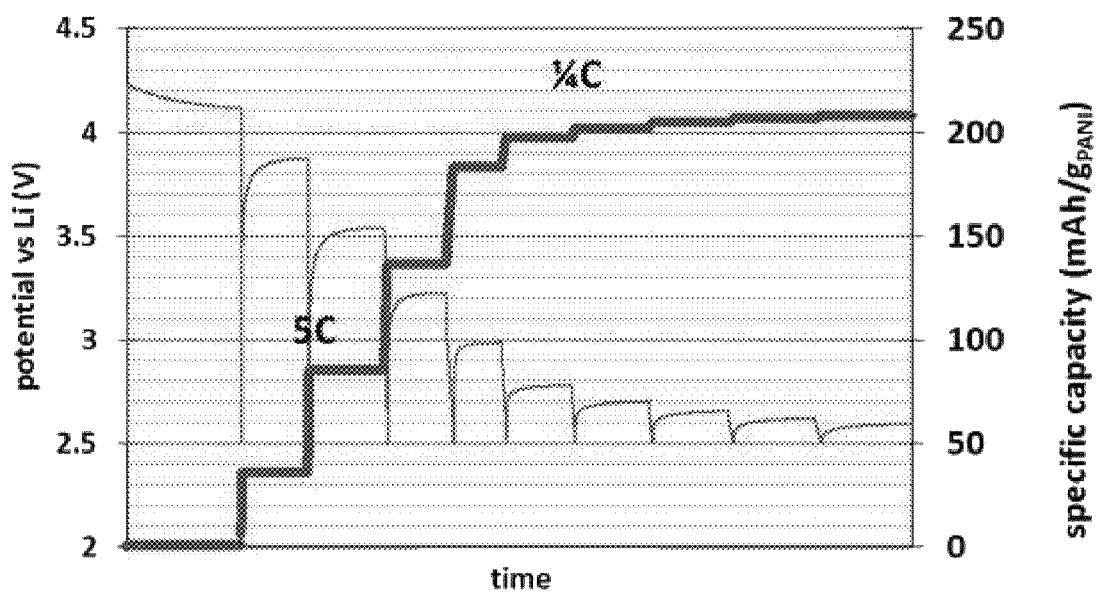
FIG. 5 is a graph of the specific capacity of the E1-PN-Li electrode material delivered in a sequential discharge test from Example 2, in accordance with one embodiment.

FIG. 5 represents the specific capacity of the E1-PN-Li electrode material delivered in a sequential discharge test. The electrode is initially charged to 4.3 V and is submitted to successive discharges to 2.5 V at decreasing current values from 15.03 mA to 23.5 µA (corresponding to discharge rates decreasing from 20 C to 1/32 C). FIG. 5 shows on the left the potential vs $Li^+/Li^0$ (in volts, V) as a function of time and on the right the specific capacity (in $mAh/g_{pN-Li}$) as a function of time. Values greater than 180 mAh/g at a 1 C rate and of 210 mAh/g at lower rates were obtained.

Figure 6:
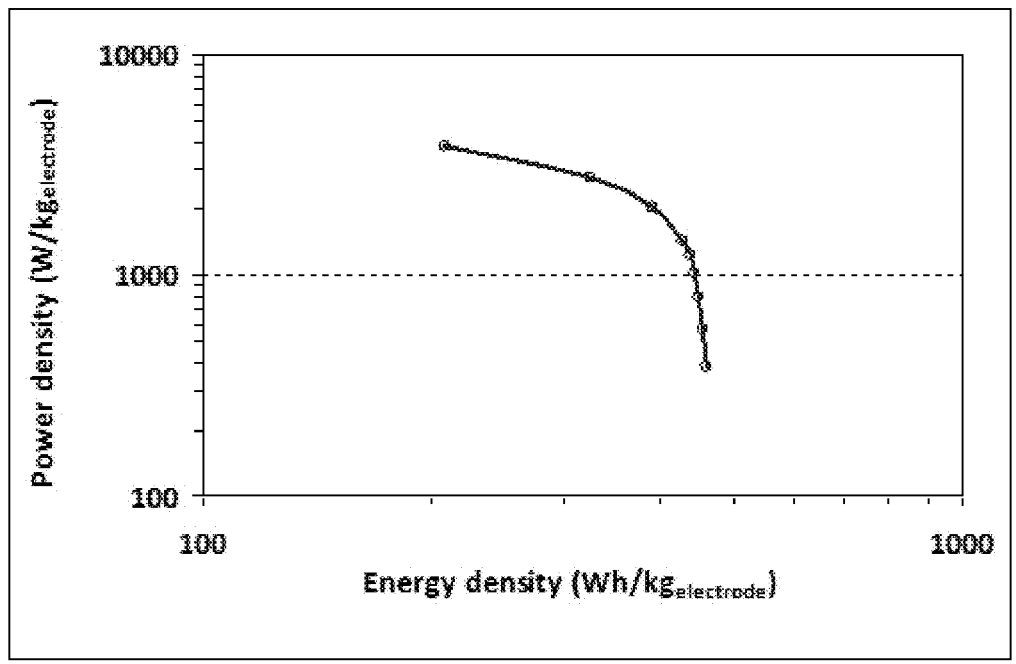
FIG. 6 is a graph of the Ragone plot (in double logarithmic scale) of the E1-PN-Li electrode material power density (in $W/kg_{electrode\ material}$) as a function of the electrode material energy density (in $Wh/kg_{electrode\ material}$) during the discharge test described above from Example 2, in accordance with one embodiment.

FIG. 6 represents the Ragone plot (in double logarithmic scale) of the E1-PN-Li electrode material power density (in $W/kg_{electrode\ material}$) as a function of the electrode material energy density (in $Wh/kg_{electrode\ material}$) during the discharge test described above. This E1-PN-Li electrode material is able to deliver energy density values of 460 Wh/kg.

To provide a comparative example, an electrode material (E1-EB) was prepared by mixing EB with polytetrafluoroethylene (PTFE) and vapour grown carbon fibers (VGCF) in 90:5:5 weight proportions and by embedding the resulting mixture in a stainless steel wire mesh current collector. This positive electrode material E1-EB is not part of the present invention.

Then, a lithium battery (Swagelok® type cell) comprising:
the obtained positive electrode material E1-EB embedded in the stainless steel wire mesh current collector (3 mg of E1-EB material); the thickness of the whole (E1-EB/current collector) was about 280 µm,
lithium metal as a negative electrode material deposited onto a copper current collector; the thickness of the lithium metal was about 400 µm,
a solution of 1M $LiPF_6$ in a mixture of EC and DMC in a 1:1 volume proportion as an electrolyte, and
a Whatman® glass fiber separator provided by GE Healthcare
was assembled inside a glove box commercialized by Jacomex.

Figure 7:
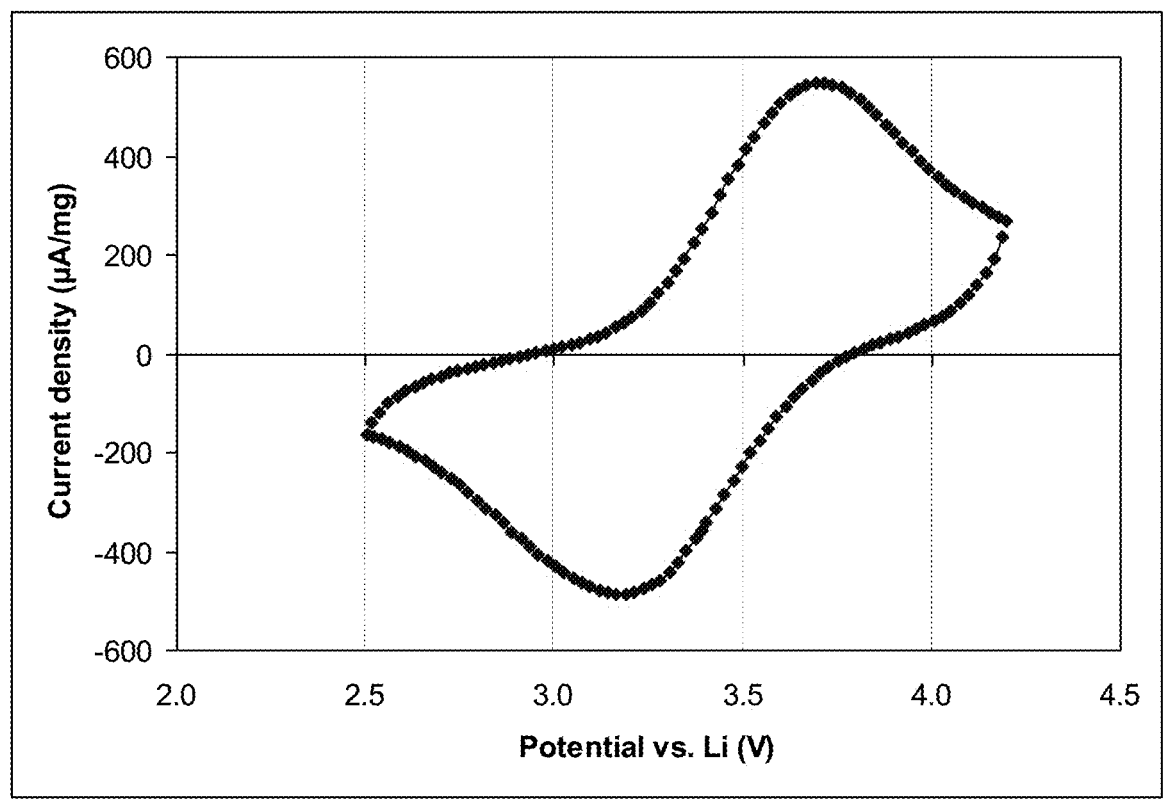
FIG. 7 is a graph of the electrochemical characterization of the E1-EB electrode material by cyclic voltammetry from Example 2, in accordance with one embodiment.

FIG. 7 represents the electrochemical characterization of the E1-EB electrode material by cyclic voltammetry. FIG. 7 shows the current density (in µA/mg) as a function of the potential (in Volts, V) versus the couple $Li^+/Li^0$ (i.e. vs $Li^+/Li^0$ potential). In FIG. 7, the lithium battery was subjected to a cyclic voltammetry test between 4.3 V and 2.5 V by measuring the potential against the negative electrode, at a scan speed of 0.5 mV/s. FIG. 7 shows that there is only one redox transition in EB when it is cycled between 2.5 V and 4.3 V, whereas in PN-Li there are two (cf. FIG. 3).

Example 3

Preparation of a Lithium Battery (i.e. Fifth Object of the Invention) Comprising a Composite Electrode Material CE1-PN-Li According to the Present Invention (i.e. Third Object of the Invention) Prepared According to the Process of the Present Invention (i.e. Fourth Object of the Invention)

5 mg of EB were dispersed in 5 ml of N-methyl-2-pyrrolidinone. Then, 195 mg of $LiFePO_4$ were added to the dispersion and the resulting mixture was stirred for 2 hours. Then, 25 ml of ethanol were added dropwise to the resulting mixture while stirring. The obtained mixture was filtered. A solid was recovered, washed with ethanol, and dried to yield $LiFePO_4$ particles coated with EB (also called LFP/EB material).

Figure 8:
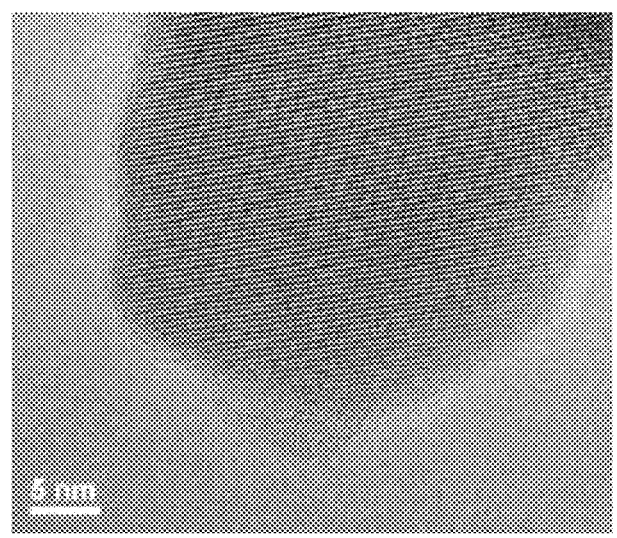
FIG. 8 is a TEM image of the obtained LFP/EB material from Example 3, in accordance with one embodiment.

FIG. 8 represents a TEM image of the obtained LFP/EB material. FIG. 8 shows the thin coating of EB covering the LiFePO$_4$ particles.

Inside an argon-filled glove box, 1.5 g of LiPF$_6$ were dissolved in 10 ml of a 1:1 mixture in volume of dimethyl carbonate and ethylene carbonate. To the resulting solution, 1 mg of N,N'-diphenyl-p-phenylenediamine and 5 μl of styrene were added. Then, a piece of 0.2 g of metallic lithium was introduced in the preceding solution. Then, 5 mg of a mixture of LFP/EB material, PTFE, and VGCF in 90:5:5 weight proportions was embedded in a stainless steel wire mesh current collector and the resulting embedded stainless steel wire was introduced in the preceding solution. The reaction was left undisturbed for 16 hours. The lithium was then removed from the reaction mixture and said reaction mixture was filtrated. A solid was recovered and washed twice with 20 ml of DMC to yield the desired positive composite electrode material CE1-PN-Li.

To provide a comparative example, a composite electrode material (CE1-carbon) was prepared by mixing carbon coated LiFePO$_4$ (LFP/C), PTFE, and VGCF in 90:5:5 weight proportions and by embedding the resulting mixture in a stainless steel wire mesh current collector. This composite positive electrode material is not part of the present invention.

All the positive electrodes materials produced had a loading of active material (LFP) of 10 mg/cm$^2$ approximately.

Two lithium batteries (Swagelok® type cell) comprising:
the obtained positive electrode material CE1-PN-Li embedded in the stainless steel wire mesh current collector (2 mg of CE1-PN-Li material) or the obtained positive electrode material CE1-carbon embedded in the stainless steel wire mesh current collector (2 mg of CE1-carbon), lithium metal as a negative electrode material deposited onto a copper current collector; the thickness of the lithium metal was about 400 μm, a solution of 1M LiPF$_6$ in a mixture of EC and DMC in a 1:1 volume proportion as an electrolyte, and a Whatman® glass fiber separator provided by GE Healthcare were assembled inside a glove box commercialized by Jacomex.

Figure 9:
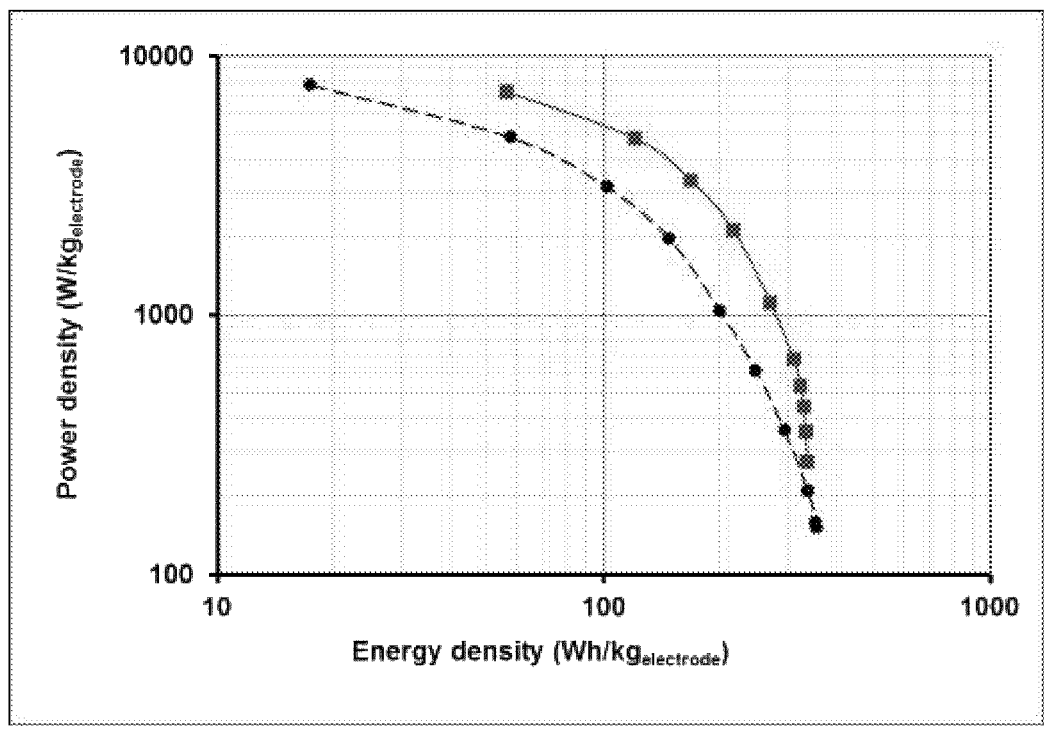
FIG. 9 is a graph of the Ragone plot of the electrode power density (in $W/kg_{electrode\ material}$) as a function of the electrode energy density (in $Wh/kg_{electrode\ material}$) for each electrode from Example 3, in accordance with one embodiment.

FIG. 9 represents the Ragone plot of the electrode power density (in W/kg$_{electrode\ material}$) as a function of the electrode energy density (in Wh/kg$_{electrode\ material}$) for each electrode, when each corresponding battery is subjected to charge-discharge tests between 4.2 V and 2.5 V at decreasing current rates from 20 C to 1/32 C (1 C being equivalent to a current density of 170 mAh/g based on LFP). The CE1-PN-Li composite electrode material (curve with squares and plain line) displays better performance at high discharge rates than the CE1-carbon composite electrode material (curve with circles and dotted line).

Example 4

Preparation of a Supercapacitor (Sixth Object of the Invention) Comprising an Electrode Material E2-PN-Li According to the Present Invention (i.e. Third Object of the Invention) Prepared According to the Process of the Present Invention (i.e. Fourth Object of the Invention)

25 mg of EB were dispersed in 10 ml of NMP. 25 mg of reduced graphene oxide (rGO) were added to the dispersion and the resulting mixture was stirred for 2 hours. 25 ml of ethanol were added dropwise to the resulting mixture while stirring. The obtained mixture was filtered. A solid was recovered, was washed with ethanol, and dried to yield reduced graphene oxide coated with EB (also called rGO/EB material).

Inside an argon-filled glove box, 1.5 g of LiPF$_6$ were dissolved in 10 ml of a 1:1 volume mixture of dimethyl carbonate and ethylene carbonate. To the resulting solution, 1 mg of N,N'-diphenyl-p-phenylenediamine and 5 μl of styrene were added. Then, a piece of 0.2 g of metallic lithium was introduced in the preceding solution. Then, 1.6 mg of a mixture of rGO/EB material, PTFE, and carbon SuperP in 90:5:5 weight proportions was embedded in a stainless steel wire mesh and the resulting embedded stainless steel wire was introduced in the preceding solution. The reaction was left undisturbed for 16 hours. The lithium was then removed from the reaction mixture and said reaction mixture was filtrated. A solid was recovered and washed twice with 20 ml of dimethyl carbonate to yield the desired positive electrode material E2-PN-Li.

To provide two comparative examples, an electrode material (E2-EB) was prepared by mixing rGO/EB material, PTFE, and carbon SuperP in 90:5:5 weight proportions, and by embedding the resulting mixture in a stainless steel wire mesh current collector; and an electrode material (E2) was prepared by mixing rGO, PTFE, and carbon SuperP in 90:5:5 weight proportions, and by embedding the resulting mixture in a stainless steel wire mesh current collector. These two positive electrodes materials are not part of the present invention.

Three lithium batteries (Swagelok® type cell) comprising:
the obtained positive electrode material E2-PN-Li embedded in the stainless steel wire mesh current collector (1.77 mg of E2-PN-Li material) or the obtained positive electrode material E2-EB embedded in the stainless steel wire mesh current collector (1.8 mg of E2-EB material) or the obtained positive electrode material E2 embedded in the stainless steel wire mesh current collector (1.75 mg of E2 material), lithium metal as a negative electrode material deposited onto a copper current collector; the thickness of the lithium metal was about 400 μm, a solution of 1M LiPF$_6$ in a mixture of EC and DMC in a 1:1 volume proportion as an electrolyte, and a Whatman glass fiber separator provided by GE Healthcare were assembled inside a glove box commercialized by Jacomex.

All the positive electrodes produced had a loading of material (rGO and PN-Li if it is present) of 10 mg/cm$^2$ approximately.

Figure 10:
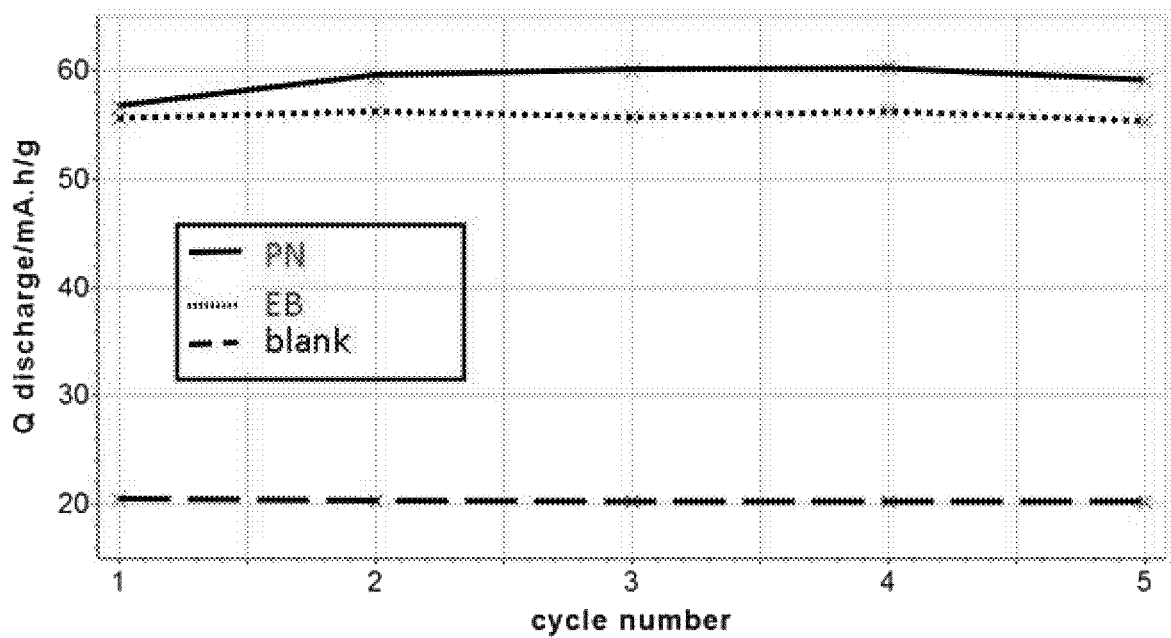
FIG. 10 is a graph of the electrochemical characterization of the E2-PN-Li electrode material (curve with plain line), of the E2-EB electrode material (curve with dotted line) and of the E2 electrode material (curve with dashed line) by cyclic voltammetry from Example 4, in accordance with one embodiment.

FIG. 10 represents the electrochemical characterization of the E2-PN-Li electrode material (curve with plain line), of the E2-EB electrode material (curve with dotted line) and of the E2 electrode material (curve with dashed line) by cyclic voltammetry. FIG. 10 shows the electrode material specific capacity (in mAh/g) obtained during repeated cycling of the battery between 2.5 and 4.3 V at a scan speed of 1 mV/s as a function of the cycle number.

Example 5

Preparation of a Lithium Battery (Fifth Object of the Invention) Comprising a Composite Electrode Material CE2-PN-Li According to the Present Invention (i.e. Third Object of the Invention) Prepared According to the Process of the Present Invention (i.e. Fourth Object of the Invention)

Inside an argon-filled glove box, 1.5 g of LiPF$_6$ were dissolved in 10 ml of a 1:1 volume mixture of dimethyl carbonate and ethylene carbonate. To the resulting solution, 1 mg of N,N'-diphenyl-p-phenylenediamine and 5 μl of styrene were added. Then, a piece of 0.2 g of metallic lithium was introduced in the preceding solution. Then, 5 mg of a mixture of LFP/EB material prepared in example 3, PTFE, and EB nanofibers in 90:5:5 weight proportions was embedded in a stainless steel wire mesh and the resulting embedded stainless steel wire mesh was introduced in the preceding solution. The reaction was left undisturbed for 16 hours. The lithium was then removed from the reaction mixture and said reaction mixture was filtrated. A solid was recovered and washed twice with 20 ml of DMC to yield the desired positive composite electrode material CE2-PN-Li (99% yield).

A lithium battery (Swagelok® type cell) comprising:

the obtained positive electrode material CE2-PN-Li embedded in the stainless steel wire mesh current collector (5.5 mg of CE2-PN-Li material, the electrode of the whole (CE2-PN-Li/current collector) was about 280 μm, lithium metal as a negative electrode material deposited onto a copper current collector; the thickness of the lithium metal was about 400 μm, a solution of 1M LiPF$_6$ in a mixture of EC and DMC in a 1:1 volume proportion as an electrolyte, and a Whatman® glass fiber separator provided by GE Healthcare was assembled inside a glove box commercialized by Jacomex.

The positive electrode produced had a loading of active material (LFP) of 25 mg/cm$^2$ approximately.

Figure 11:
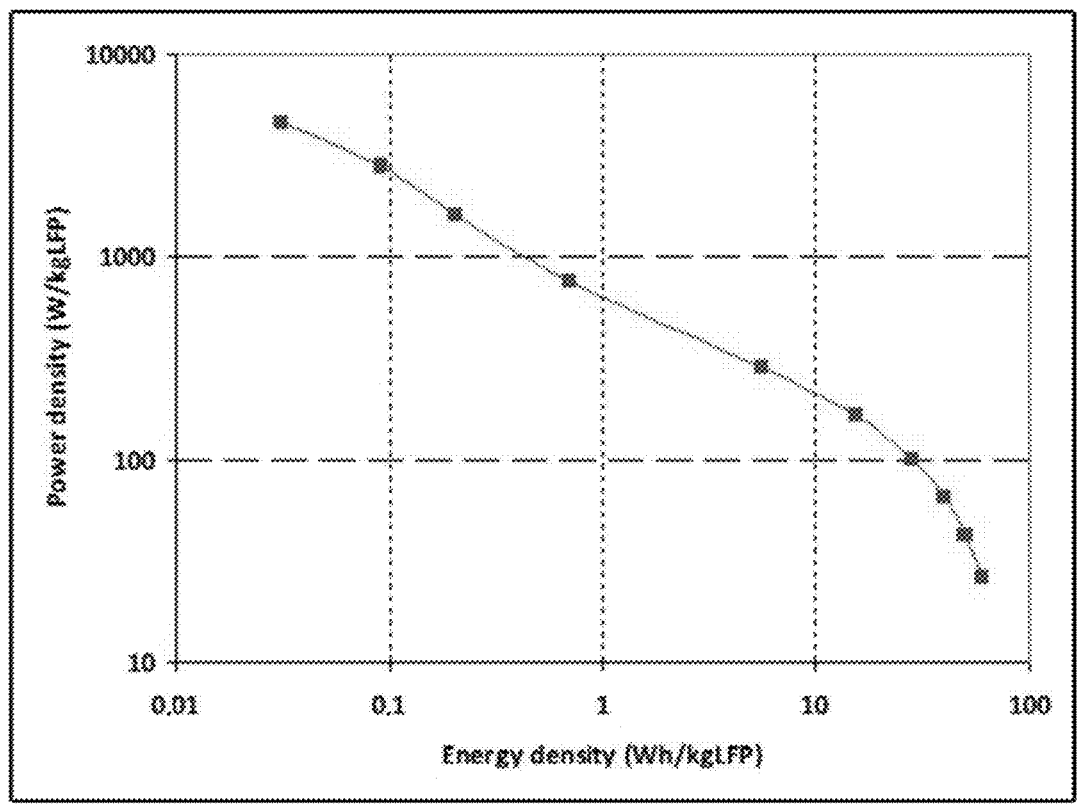
FIG. 11 is a Ragone plot of the electrode power density (in $W/kg_{LFP}$) as a function of the electrode energy density (in $Wh/kg_{LFP}$) for the obtained positive electrode from Example 5, in accordance with one embodiment.

FIG. 11 represents the Ragone plot of the electrode power density (in W/kg$_{LFP}$) as a function of the electrode energy density (in Wh/kg$_{LFP}$) for the obtained positive electrode, when the battery is subjected to charge-discharge tests between 4.2 V and 2.5 V at decreasing current rates from 20 C to 1/32 C (1 C being equivalent to a current density of 170 mAh/g based on LFP).

Example 6

Preparation of a Free-Standing Membrane Film MF-PN-Li According to the Present Invention (i.e. Seventh Object of the Invention) and Prepared According to the Process of the Present Invention (i.e. Eighth Object of the Invention)

A dispersion of 1 mg of poly(vinylenedifluoride) (PVDF) and 19 mg of EB in 1 ml of NMP was prepared by stirring. The mixture was spread on a flat glass substrate with a surface of around 25 cm$^2$. The deposition was dried for 24 hours at 60° C. to obtain a film. The film was peeled off from the glass substrate by immersion in distilled water and it was dried again to remove water.

Inside an argon-filled glove box, 1.5 g of LiPF$_6$ were dissolved in 10 ml of a 1:1 mixture of ethylene carbonate and dimethyl carbonate. To the resulting solution, 2 mg of N,N'-diphenyl-p-phenylenediamine and 10 μl of styrene were added. Then, a piece of 0.4 g of metallic lithium was introduced in the preceding solution. Then, the film previously prepared (20 mg) was introduced in the preceding solution. The reaction was left undisturbed for 16 hours. The lithium was then removed from the reaction mixture and said reaction mixture was filtrated. A membrane film of PN-Li material was recovered and washed thrice with 50 ml of DMC to yield the desired flexible, resistant and electrically conducting thin (~1 μm) membrane film MF-PN-Li (21.5 mg).

Comparative Example 7

Preparation of a Lithium-Doped EB (emeraldine Base)

Inside an argon-filled glove box, 3.038 g of LiPF$_6$ were dissolved in 20 ml of an equivolume of ethylene carbonate and dimethyl carbonate. To the resulting solution, 10 mg of a polyaniline film in the emeraldine base state (EB) was introduced in the preceding solution. The reaction was left with no agitation for 48 hours at room temperature. The reaction mixture was filtrated. A film was recovered and washed twice with diethyl ether and dry in vacuum at 60° C. for 4 h to yield 18.1 mg of the desired material EB-Li.

EB-Li is not part of the invention. EB-Li is described in [Manuel et al., Material Research Bulletin, 2010, 45, 265].

Figure 12:
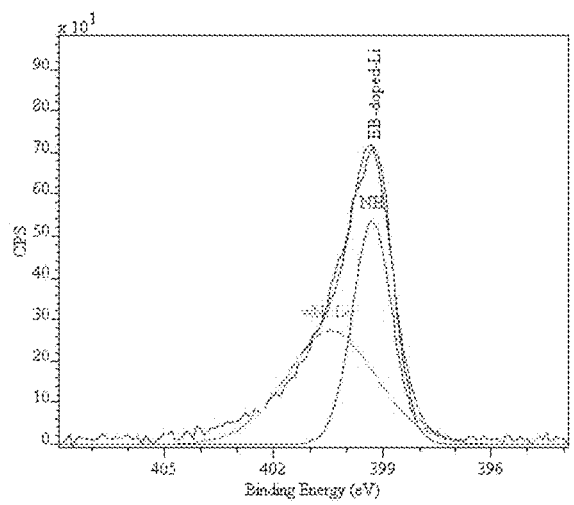
FIGS. 12a-12c are plots represent the N1s (nitrogen) region of the XPS analysis of EB-Li (FIG. 12a), and for comparison the N1s region of the XPS analysis of PN-Li (FIG. 12b) and the N1s region of the XPS analysis of EB (FIG. 12c) from Example 7, in accordance with one embodiment.
Figure 12:
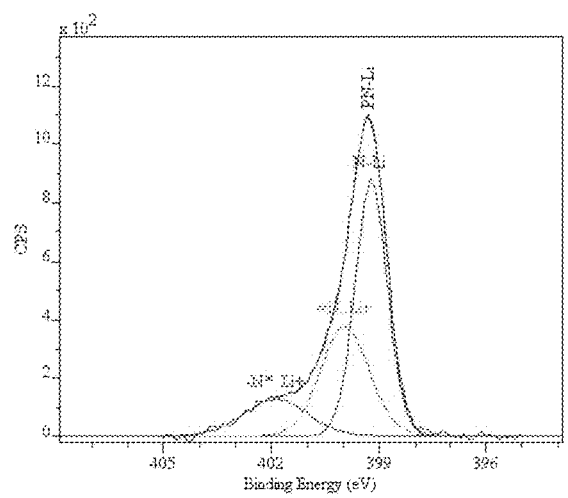
Figure 12:
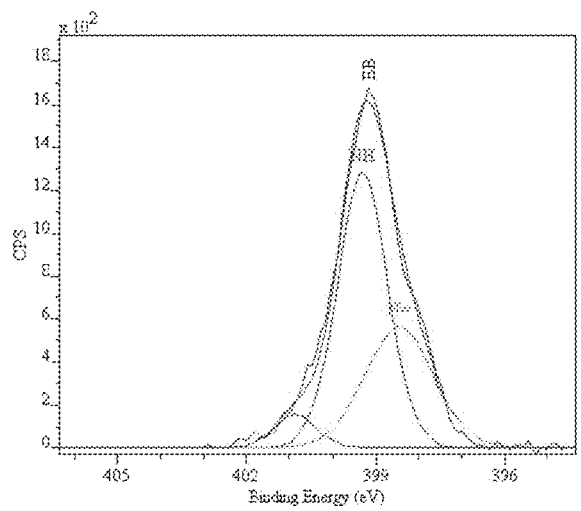

FIG. 12 represents the N1s (nitrogen) region of the XPS analysis of EB-Li (FIG. 12a), and for comparison the N1s region of the XPS analysis of PN-Li (FIG. 12b) and the N1s region of the XPS analysis of EB (FIG. 12c).

PN-Li is part of the invention and has been obtained according to the procedure described in example 6.

EB is pure emeraldine base (starting material). It is not part of the invention.

FIG. 12 shows for each material, the CPS (Counts per second, from the detector of electrons) as a function of the binding energy (in eV). The XPS analyses have been conducted in the same way (i.e. same parameters) for each material.

FIG. 12 clearly shows that the chemical environment of the nitrogen atoms changes from the starting EB material to the two different materials EB-Li and PN-Li, indicating that the PN-Li material of the present invention does not have the same structure as the ones of EB-Li and EB. More particularly, a new signal at 402 eV is obtained for the PN-Li material.

The invention claimed is:

1. A lithium-doped Pernigraniline-based material (PN-Li), comprising
at least one polymer chain formed by the succession of C$_6$H$_4$ rings and nitrogen atoms, each nitrogen atom being linked in para position relative to each C$_6$H$_4$ ring;
n repeating units;
a total amount X of lithium cations (Li$^+$);
an average amount of lithium cations (Li$^+$) per repeating unit, with x=X/n;
a total amount Y of anions (A$^{m-}$);
an average amount y of charge provided by anions (A$^{m-}$) per repeating unit, with y=mY/n;
a charge q of each repeating unit,
a total charge Q of the polymer chain, with $$Q = \sum_{i}^{n} q_i$$

mY−X since Q is compensated by the charges of Li$^+$ and A$^{m-}$;
Q/n represents the formal oxidation state and Q/n=y−x; and
wherein said PN-Li responds to the following formula (I):

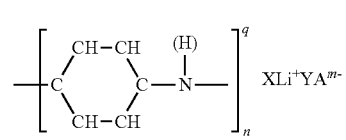

in which:
* 4≤n≤500,000,
* q is equal to −1, 0 or +1,

* the mean atomic ratio hydrogen/nitrogen (H/N) for each repeating unit is such that $4 \leq H/N < 4.5$,
* $-1 \leq Q/n < 0$,
* $0.5 \leq x \leq 1$,
* $0 \leq y \leq 0.5$.

2. A method for the preparation of a lithium-doped Pernigraniline-based material (PN-Li) as defined in claim 1, wherein it comprises at least the following steps:
  1) putting into contact Polyaniline (P) with a deprotonation solution to obtain a reaction mixture, said deprotonation solution comprising:
    at least one aprotic solvent,
    at least one lithium salt which is soluble in said aprotic solvent,
    at least one lithiated organic compound (Li—$OC_1$) or a precursor of a lithiated organic compound Li—$OC_1$, said Li—$OC_1$ or precursor being soluble in said aprotic solvent, and said Li—$OC_1$ being a strong Brönsted base able to deprotonate the amine groups present in Polyaniline (P),
  2) leaving the reaction mixture optionally with mixing,
  3) recovering lithium-doped Pernigraniline-based material (PN-Li).

3. The method according to claim 2, wherein the deprotonation solution further comprises an organic compound $OC_2$ which is soluble in said aprotic solvent and which comprises an alkene functional group.

4. The method according to claim 2, wherein the lithiated organic compound Li—$OC_1$ is selected from lithium amides, lithium enolates, lithium ester enolates, lithium acetylides, organolithium compounds, and mixtures thereof.

5. The method according to claim 2, wherein the precursor $PR_1$ of the lithiated organic compound Li—$OC_1$ is metallic lithium (Li) and the precursor $PR_2$ of the lithiated organic compound Li—$OC_1$ is any one of the following conjugated acids of $OC_1$: an amine, a keton, an ester, an alkyne or an alkyl halide.

6. A positive electrode material comprising:
  at least one polymeric binder,
  optionally a material conferring electronic conduction other than PN-Li,
  optionally an active material other than PN-Li, and
  wherein it further comprises a lithium-doped Pernigraniline material PN-Li as defined in claim 1.

7. The positive electrode material according to claim 6, wherein said positive electrode material is a lithium battery-type positive electrode material comprising with respect to the total weight of the positive electrode material:
  from 60 weight % to 98 weight % of PN-Li,
  from 1 weight % to 15 weight % of a material conferring electronic conduction other than PN-Li, and
  from 1 weight % to 15 weight % of a polymeric binder; and
  wherein said positive electrode material does not comprise any other active material than PN-Li.

8. The positive electrode material according to claim 6, wherein said positive electrode material is a supercapacitor-type positive electrode material comprising with respect to the total weight of the positive electrode material:
  from 35 weight % to 60 weight % of PN-Li,
    from 15 weight % to 60 weight % of a material conferring electronic conduction other than PN-Li having a high specific surface area ranging from 400 $m^2/g$ to 3000 $m^2/g$, and
  from 1 weight % to 15 weight % of a polymeric binder; and wherein said positive electrode material does not comprise any other active material than PN-Li.

9. The positive electrode material according to claim 6, wherein it is a lithium battery-type composite positive electrode material comprising from 60 weight % to 96 weight % of an active material other than PN-Li with respect to the total weight of the positive electrode material.

10. A method for the preparation of a positive electron material as defined in claim 6 wherein said method comprises at least the following steps:
  A) preparing a composition comprising Polyaniline (P), at least one polymeric binder, optionally a material conferring electronic conduction other than PN-Li, and optionally an active material other than PN-Li, and
  B) preparing a composition comprising at least one lithium-doped Pernigraniline-based material (PN-Li) from the composition of step A) according to the following steps:
    1) putting into contact Polyaniline (P) with a deprotonation solution to obtain a reaction mixture, said deprotonation solution comprising:
      at least one aprotic solvent,
      at least one lithium salt which is soluble in said at least one aprotic solvent,
      at least one lithiated organic compound (Li—$OC_1$) or a precursor of a lithiated organic compound Li—$OC_1$, said Li—$OC_1$ or said precursor being soluble in said at least one aprotic solvent, and said Li—$OC_1$ being a strong Brönsted base able to deprotonate the amine groups in the Polyaniline (P),
    2) leaving the reaction mixture optionally with mixing, and
    3) recovering lithium-doped Pernigraniline-based material (PN-Li).

11. A lithium battery comprising:
  a positive electrode material,
  a negative electrode material,
    a separator which acts as an electrical insulator and allows the transport of ions, and
    a non-aqueous electrolyte comprising at least one lithium salt and an aprotic solvent, and
  wherein the positive electrode material is a battery-type positive electrode material or a battery-type composite electrode material as defined in claim 7.

12. A supercapacitor comprising:
  a positive electrode material,
  a negative electrode material,
    a separator which acts as an electrical insulator and allows the transport of ions, and
    a non-aqueous electrolyte comprising at least one lithium salt and an aprotic solvent, and
  wherein the positive electrode material is a supercapacitor-type positive electrode material as defined in claim 8.

13. A free-standing membrane comprising with respect to the total weight of the membrane:
  from 2 weight % to 15 weight % of a polymeric binder, and
    wherein the membrane further comprises from 85 weight % to 98 weight % of PN-Li as defined in claim 1.

14. A method for the preparation of a membrane as defined in claim 13, wherein said method comprises at least the following steps:
  i) preparing a composition comprising Polyaniline (P), at least one polymeric binder in the form of a film, and ii) preparing a composition comprising at least one lithium-doped Pernigraniline-based material (PN-Li) from the composition of step i) according to the following steps:
1) putting into contact Polyaniline (P) with a deprotonation solution to obtain a reaction mixture, said deprotonation solution comprising:
at least one aprotic solvent,
at least one lithium salt which is soluble in said at least one aprotic solvent,
at least one lithiated organic compound (Li—$OC_1$) or a precursor of a lithiated organic compound Li—$OC_1$, said Li—$OC_1$ or said precursor being soluble in said at least one aprotic solvent, and said Li—$OC_1$ being a strong Brönsted base able to deprotonate the amine groups in the Polyaniline (P),
2) leaving the reaction mixture optionally with mixing, and
3) recovering lithium-doped Pernigraniline-based material (PN-Li).

15. A method for the preparation or the modification of a lithium-doped Pernigraniline-based material (PN-Li) as defined in claim 1, wherein it comprises at least one step of submitting to a charge a battery having
a positive electrode material,
a negative electrode material,
a separator which acts as an electrical insulator and allows the transport of ions, and
a non-aqueous electrolyte comprising at least one lithium salt and an aprotic solvent,
or a supercapacitor having
a positive electrode material,
a negative electrode material,
a separator which acts as an electrical insulator and allows the transport of ions, and
a non-aqueous electrolyte comprising at least one lithium salt and an aprotic solvent.

16. An active material in electrodes, or a binder, or a conducting agent, in any one of batteries, supercapacitors, electronic and/or optoelectronic devices like solar cells, photoconductors, light-emitting or electrochromic devices, field effect transistors, electromagnetic radiation absorbers, gas sensors, separation membranes, antistatic coatings, conducting molecular wires and anticorrosion coatings comprising:
a lithium-doped Pernigraniline-based material PN-Li as defined in claim 1.

* * * * *